US012711642B2

(12) United States Patent
Isei et al.

(10) Patent No.: US 12,711,642 B2
(45) Date of Patent: Aug. 18, 2026

(54) CRANKSHAFT SHAPE INSPECTION METHOD, ARITHMETIC UNIT, PROGRAM, AND SHAPE INSPECTION APPARATUS

(71) Applicant: NIPPON STEEL CORPORATION, Tokyo (JP)

(72) Inventors: Yoshito Isei, Tokyo (JP); Kousuke Sakai, Tokyo (JP); Shinya Ikeda, Tokyo (JP); Yuki Usutani, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 325 days.

(21) Appl. No.: 18/277,354

(22) PCT Filed: Apr. 22, 2021

(86) PCT No.: PCT/JP2021/016292
§ 371 (c)(1),
(2) Date: Aug. 15, 2023

(87) PCT Pub. No.: WO2022/224404
PCT Pub. Date: Oct. 27, 2022

(65) Prior Publication Data
US 2024/0144504 A1 May 2, 2024

(51) Int. Cl.
*G06T 7/521* (2017.01)
*G01B 11/24* (2006.01)
(Continued)

(52) U.S. Cl.
CPC .............. *G06T 7/521* (2017.01); *G01B 11/24* (2013.01); *G06T 7/001* (2013.01); *G06T 7/337* (2017.01); *G06T 2207/10028* (2013.01)

(58) Field of Classification Search
CPC ... G01B 11/24; G01B 11/245; G01B 11/2513; G01B 5/003; G06T 7/521; G06T 7/001;
(Continued)

(56) References Cited

U.S. PATENT DOCUMENTS 10,598,481 B2 * 3/2020 Isei ........................ G01B 11/24
11,280,605 B2 * 3/2022 Zhao ...................... G01B 11/25
(Continued)

FOREIGN PATENT DOCUMENTS

EP 3 306 265 A1 4/2018
EP 3 431 920 A1 1/2019
(Continued)

OTHER PUBLICATIONS

"Development and application of automatic optical inspection software for automobile crankshaft", Li Hao, Engineering Technology, Issue 03, 2019, pp. C035-113, Feb. 16, 2019, with English Abstract.
(Continued)

*Primary Examiner* — An H Do
(74) *Attorney, Agent, or Firm* — Birch, Stewart, Kolasch & Birch, LLP

(57) ABSTRACT

A crankshaft shape inspection method includes: acquisition step that acquires three-dimensional point cloud data of a surface of a crankshaft S; generation step that generates, while using the three-dimensional point cloud data, first point cloud data based on point cloud data generated by performing isolated point removal processing that removes data points whose distance to the nearest neighbor data point is equal to or more than first threshold value Th1 and generates second point cloud data based on point cloud data generated by performing isolated point removal processing that removes data points whose distance to the nearest neighbor data point is equal to or more than second threshold value Th2 (>the first threshold value Th1); and a calculation step that calculates a side dimension of a counterweight SC using the first point cloud data and calculates a longitudinal position of the counterweight SC using the second point cloud data.

14 Claims, 18 Drawing Sheets

(51) Int. Cl.
*G06T 7/00* (2017.01)
*G06T 7/33* (2017.01)

(58) Field of Classification Search
CPC ........... G06T 7/337; G06T 2207/30164; G06T 2207/10028
See application file for complete search history.

(56) References Cited

U.S. PATENT DOCUMENTS

| | | | | |
|---|---|---|---|---|
| 11,644,303 | B2 * | 5/2023 | Heidemann .......... | G01B 11/005<br>382/103 |
| 2018/0172436 | A1 | 6/2018 | Isei et al. | |
| 2019/0128663 | A1 | 5/2019 | Isei et al. | |

FOREIGN PATENT DOCUMENTS

| | | | |
|---|---|---|---|
| JP | 59-184814 | A | 10/1984 |
| JP | 6-265334 | A | 9/1994 |
| JP | 10-62144 | A | 3/1998 |
| JP | 2007-212357 | A | 8/2007 |
| JP | 2009-168744 | A | 7/2009 |
| WO | WO 2016/194728 | A1 | 12/2016 |
| WO | WO 2017/159626 | A1 | 9/2017 |

OTHER PUBLICATIONS

"Non-iterative denoising algorithm based on a dual threshold for a 3D point cloud", Shengtao Zhou et al., Optics and Lasers in Engineering, vol. 126, Issue 45, p. 105921, Mar. 1, 2020, with English Abstract.

* cited by examiner

F I G. 2B
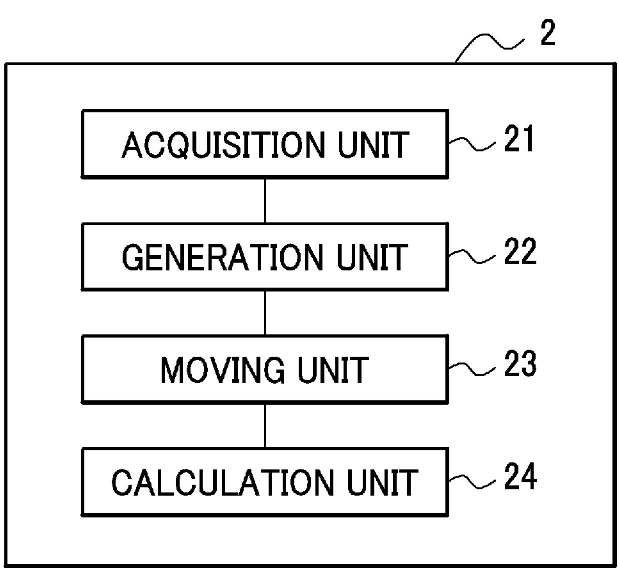
F I G. 2C
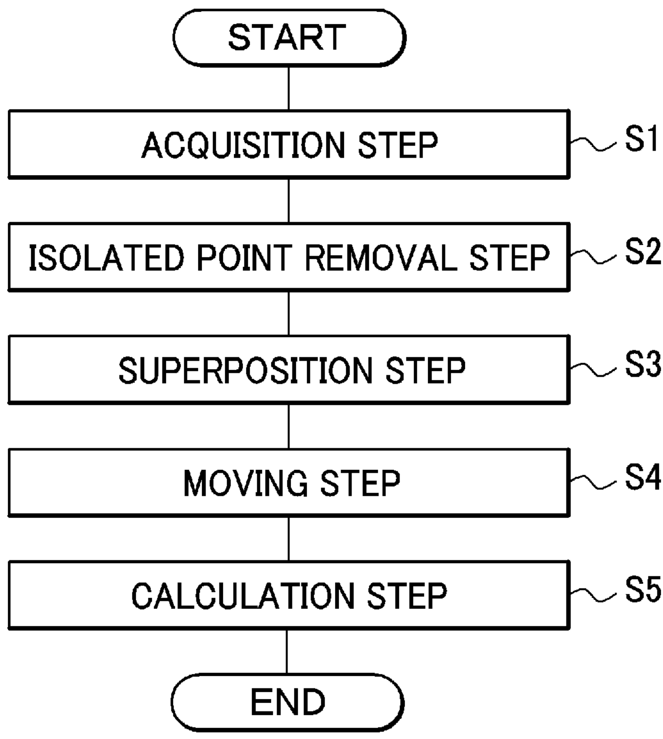

F I G. 3A
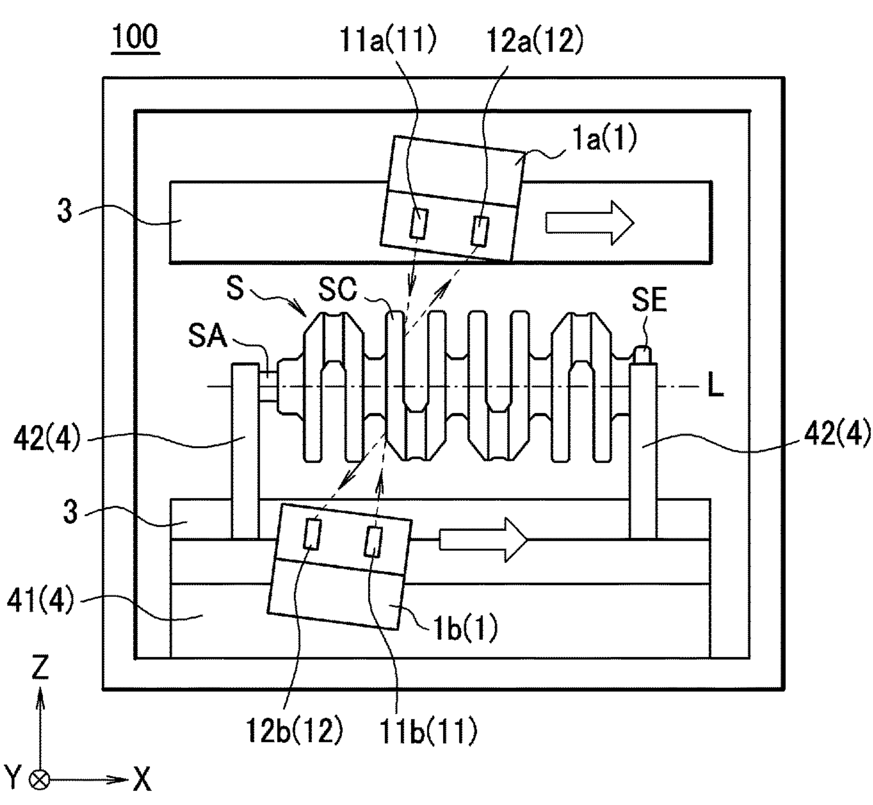
F I G. 3B
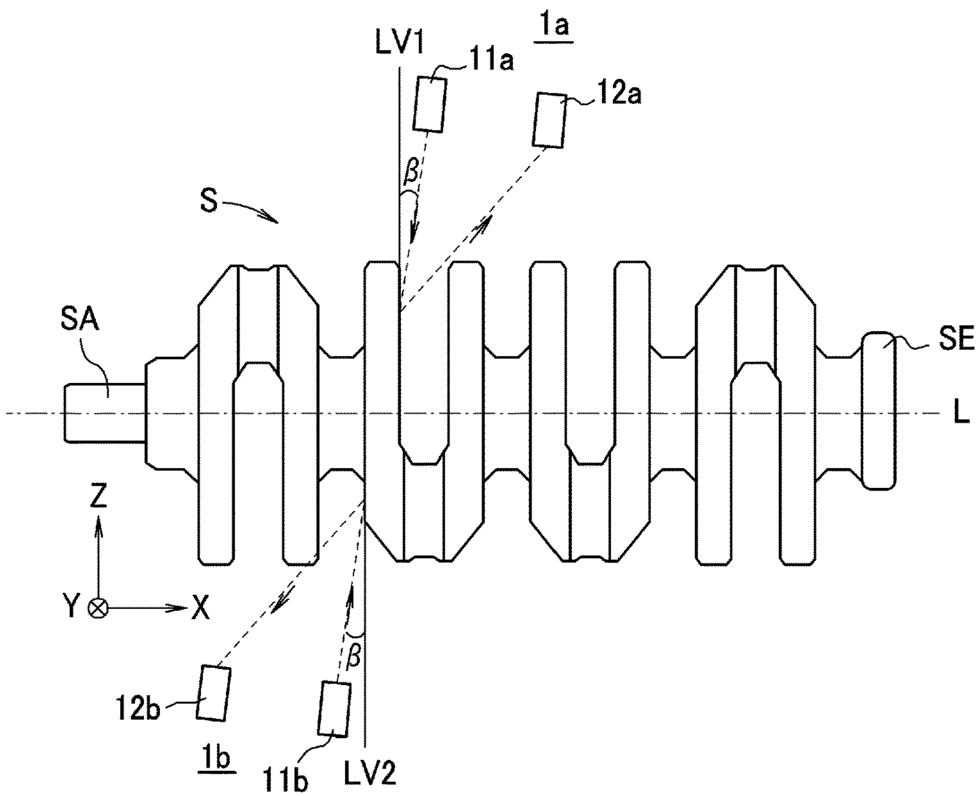

F I G. 5A
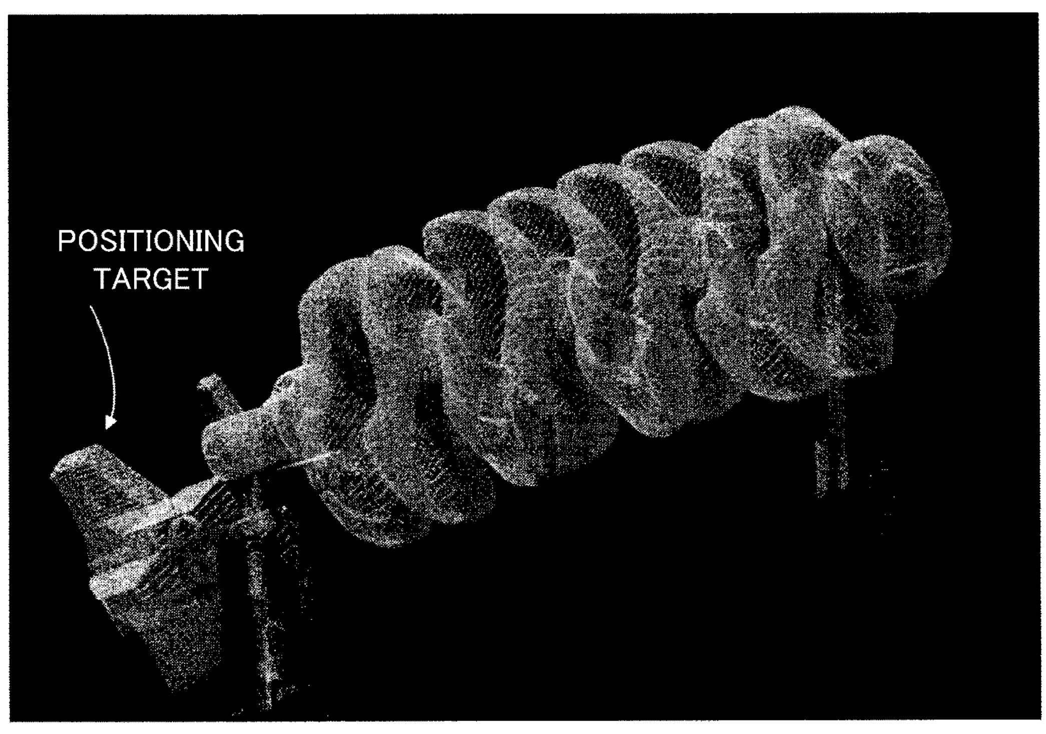
F I G. 5B
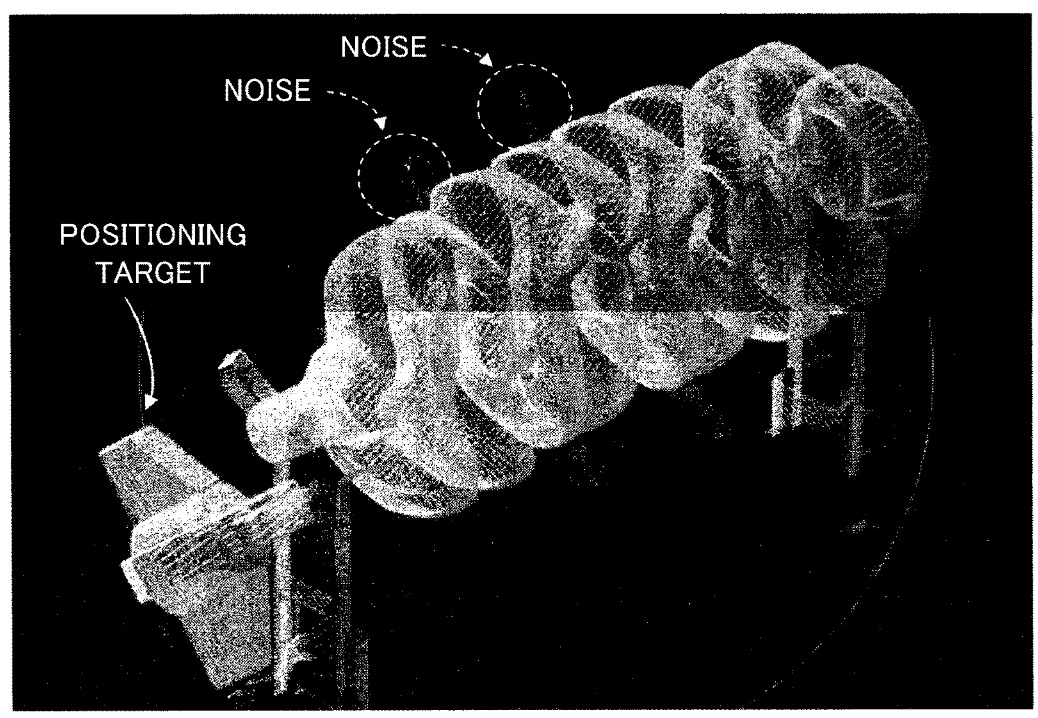

F I G. 9A
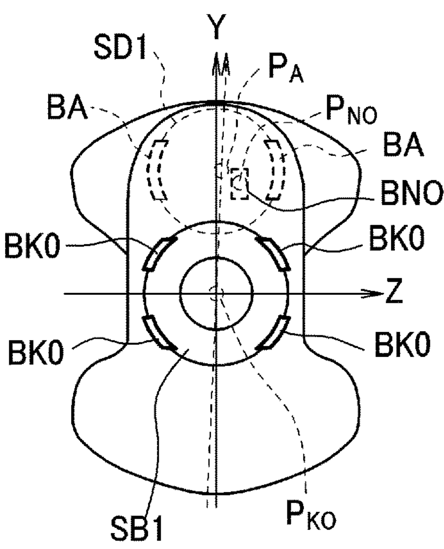
F I G. 9B
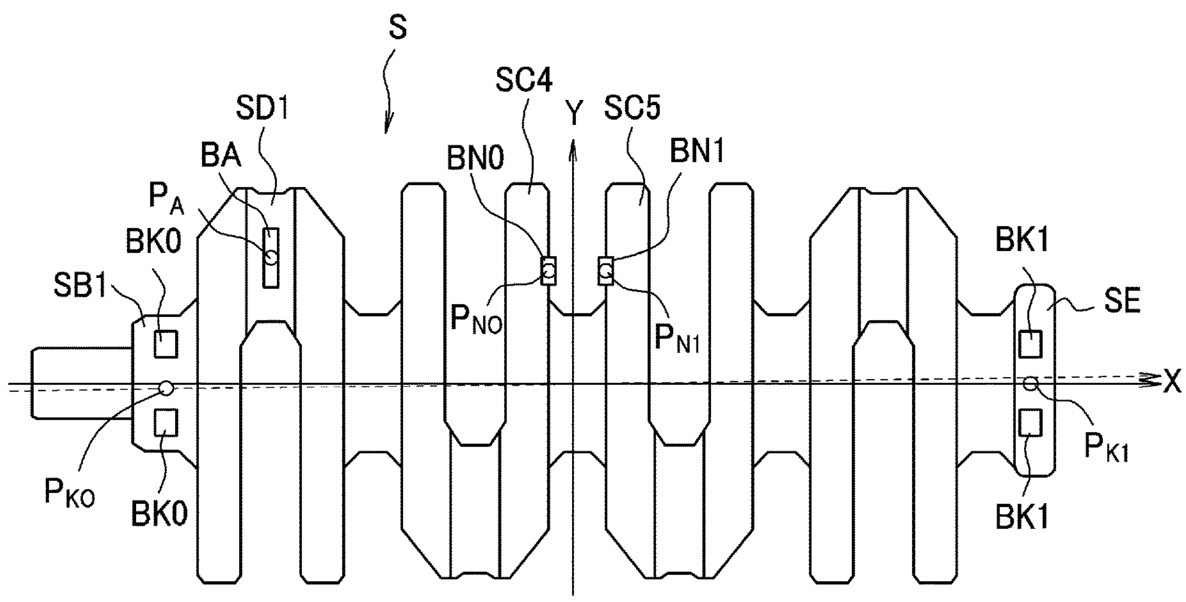

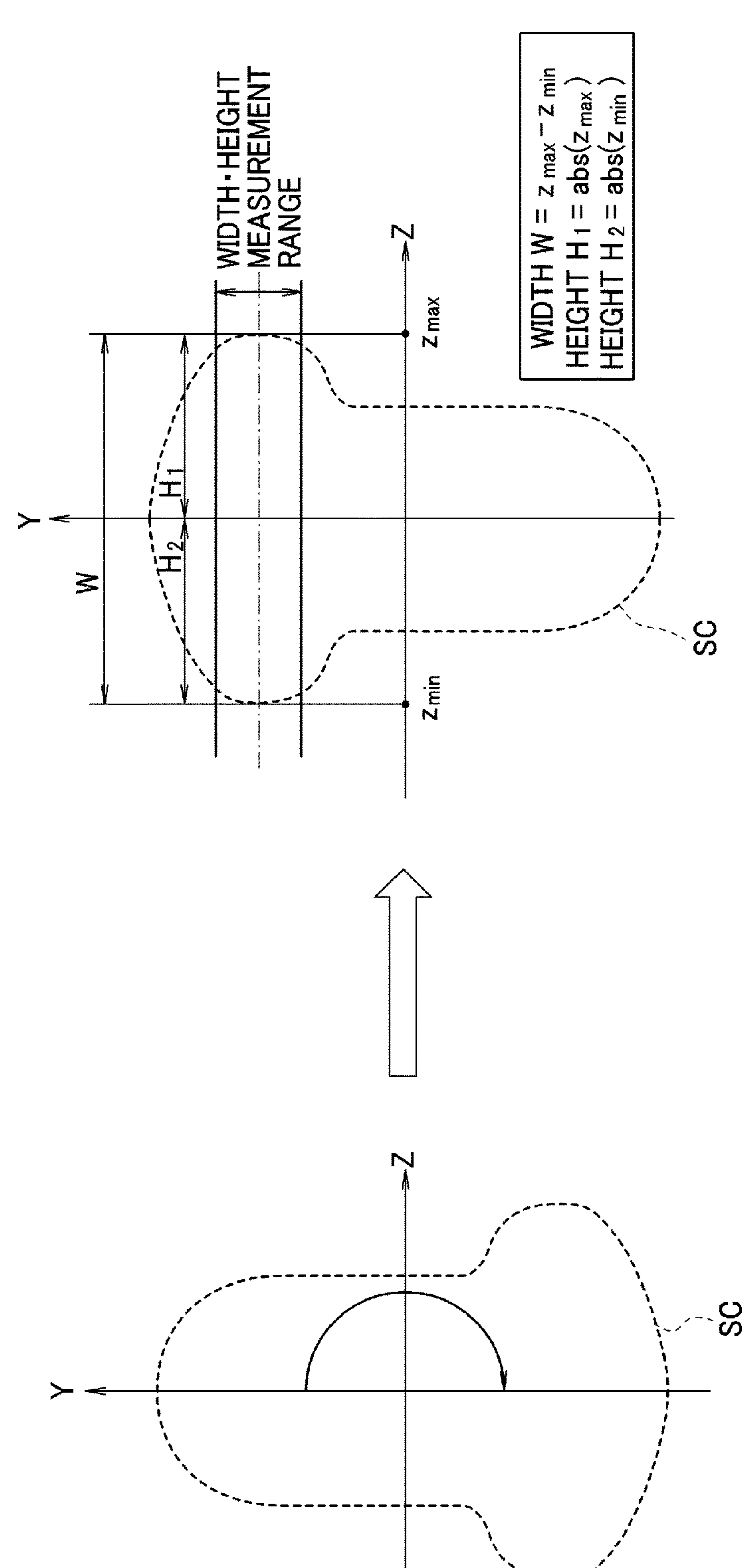
F I G. 11
WIDTH・HEIGHT
MEASUREMENT
RANGE
WIDTH W = z max − z min
HEIGHT H1 = abs(z max)
HEIGHT H2 = abs(z min)
Z
Y
W
H1
H2
z max
z min
SC
Z
Y
SC F I G. 15
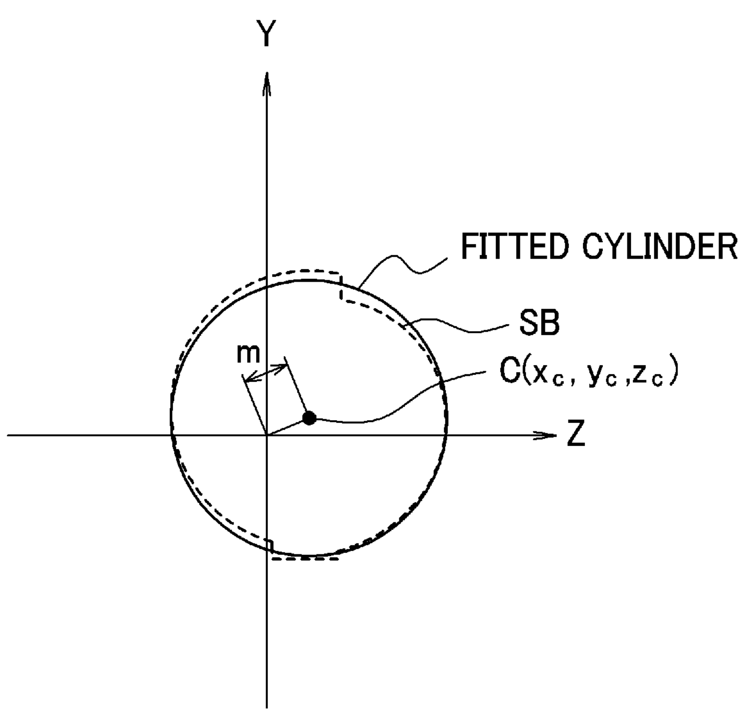

F I G. 16A
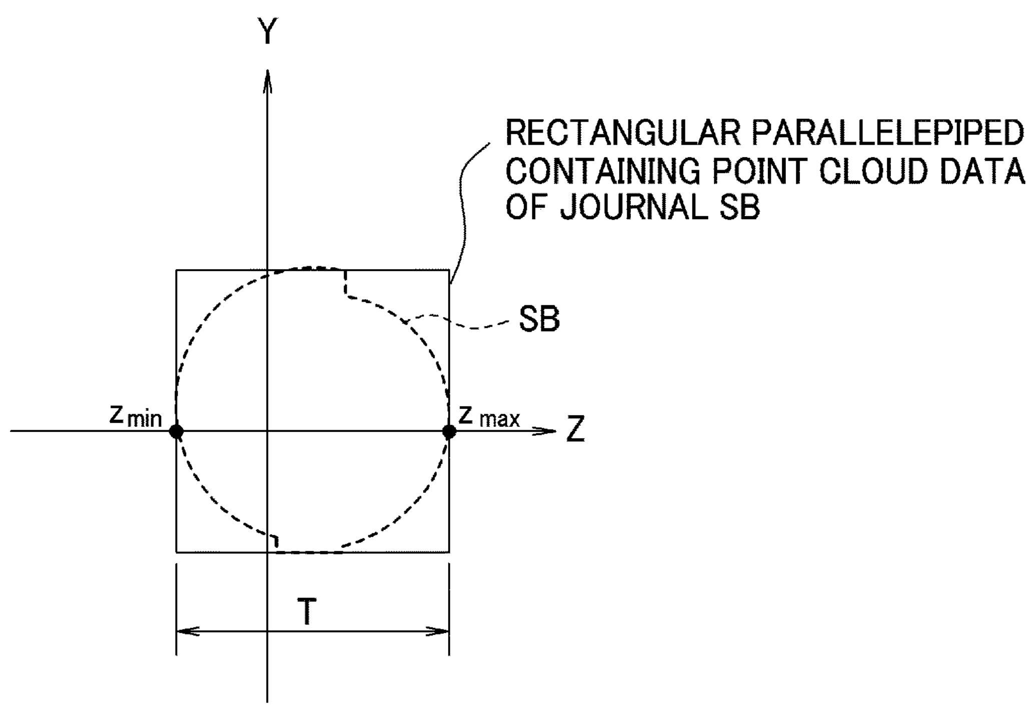
F I G. 16B
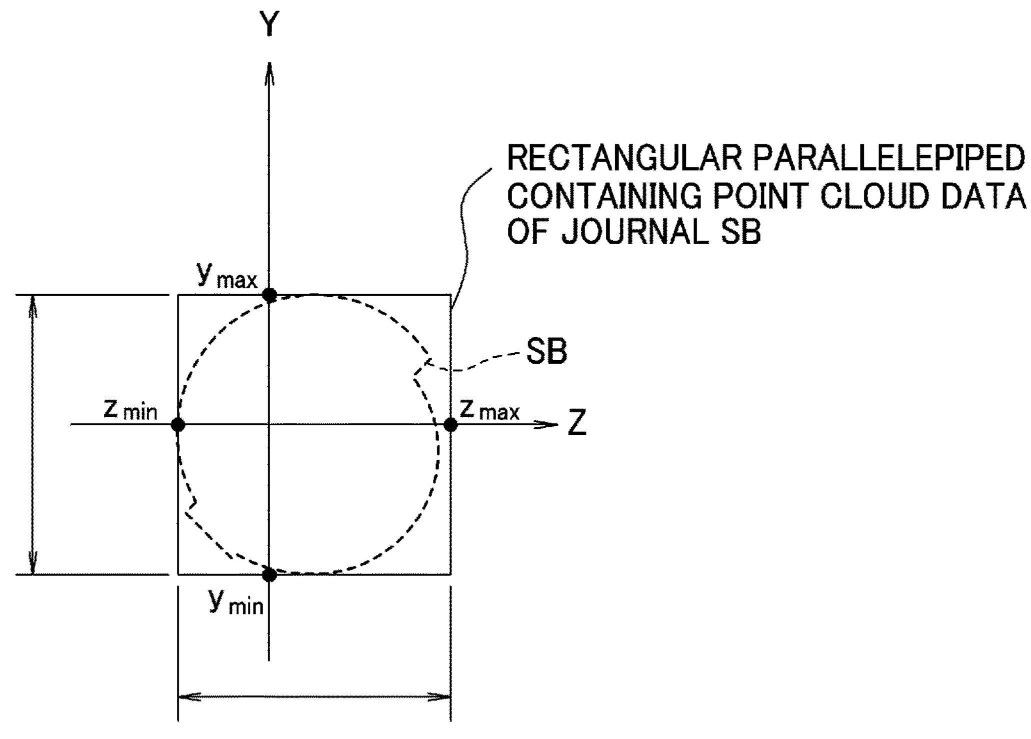

CRANKSHAFT SHAPE INSPECTION METHOD, ARITHMETIC UNIT, PROGRAM, AND SHAPE INSPECTION APPARATUS

TECHNICAL FIELD

The present invention relates to a crankshaft shape inspection method, an arithmetic unit, a program, and a shape inspection apparatus that inspect the shape of a crankshaft used in automobile engines, and the like.

BACKGROUND ART

FIG. 1A and FIG. 1B each are a view schematically illustrating one example of a crankshaft (crankshaft for inline four-cylinder engine). FIG. 1A is a front view of a crankshaft S viewed from the direction of a rotation center axis L, and FIG. 1B is a side view of the crankshaft S viewed from the direction orthogonal to the rotation center axis L.

As illustrated in FIG. 1A and FIG. 1B, the crankshaft S includes a front SA provided on the rotation center axis L of the crankshaft S, a plurality of journals SB provided on the rotation center axis L (in the example illustrated in FIG. 1A and FIG. 1B, a first journal SB1 to a fifth journal SB5), a plurality of counterweights SC for balancing the rotation provided on the rotation center axis L (in the example illustrated in FIG. 1A and FIG. 1B, a first counterweight SC1 to an eighth counterweight SC8), a plurality of pins SD for attaching connecting rods (not illustrated) each provided at a predetermined angular position around the rotation center axis L (in the example illustrated in FIG. 1A and FIG. 1B, a first pin SD1 to a fourth pin SD4), and a flange SE provided on the rotation center axis L. The cross-sectional shape of the pin SD is a circular shape centered at a position away from the rotation center axis L, and the cross-sectional shapes of the front SA, the journals SB, and the flange SE, which are shaft portions of the crankshaft S corresponding to shaft parts of an engine, are a circular shape centered on the rotation center axis L of the crankshaft S. The cross-sectional shape of the counterweight SC is a symmetrical complex shape.

The crankshaft S illustrated in FIG. 1A and FIG. 1B is manufactured as follows: a heated material is pressed with upper and lower dies to be subjected to die forging, and thereby a forged product including flash is formed, the flash are removed, and the forged product is subjected to shot blasting. The crankshaft S manufactured through these manufacturing processes is machined by cutting so as to be incorporated appropriately when incorporated into an automobile engine or another part. Specifically, the shaft portions (the front SA, the journals SB, and the flange SE) and the pins SD of the crankshaft S are machined to have a cylindrical shape. These shaft portions and pins SD are each provided with a machining stock of about several millimeters to enable machining.

As above, since the crankshaft has a complex shape, during forging, variations in material dimensions, unevenness of a material temperature, variations in forging operations, or the like sometimes causes a defect called underfill in which the material does not fill up to the edge of the die, or a bend or a twist over the entire length of the crankshaft. Further, a dent flaw is also caused in some cases when the crankshaft comes into contact with conveyance equipment or another object during handling. Furthermore, the shaft portions and the pins, which are machining portions of the crankshaft, do not have a sufficient machining stock in some cases. For this reason, in the manufacturing process of the crankshaft, before machining, the actual shape of the crankshaft is inspected by comparing it with a reference shape to determine whether the crankshaft is accepted or rejected.

Criteria for determining whether the crankshaft is accepted or rejected include the following: (a) a bend and a twist of the crankshaft must be within a predetermined allowable range, (b) the counterweight must have no underfill or dent flaw that exceeds an allowable range, and (c) the shaft portion and the pin, which are machining portions, must have a predetermined machining stock.

The above (a) and (b) are set as conditions necessary for achieving the dimensional accuracy and weight balance of the crankshaft as a final product. This is because if the crankshaft is bent or twisted so much that the installation position of the pin deviates from a predetermined angle greatly, it will be difficult to achieve the dimensional accuracy and weight balance of the crankshaft as a final product, no matter what machining is performed in the subsequent processes. Further, this is because also in the case where the shape of the counterweight is not as designed and the center of gravity shifts due to the underfill or dent flaw, it will be similarly difficult to achieve the weight balance of the crankshaft as a final product.

The above (c) is set as a condition necessary for machining. This is because no matter how well the weight balance of the crankshaft is achieved, if there is no sufficient machining stock, it is difficult to achieve the dimensional accuracy after machining, and further, the forged surface with poor surface properties remains, failing to use the crankshaft as an engine component.

Specifically, acceptance or rejection of the bend of the crankshaft is determined as follows: the amounts of deviation of the shaft portions (the front, the journals, and the flange) from the rotation center axis when the crankshaft is adjusted to a coordinate system (XYZ coordinate system in FIG. 1A and FIG. 1B) at the time of machining are used as a management index, and the acceptance or rejection is determined by whether or not this management index is within a tolerance (for example, within ±1 mm). Further, acceptance or rejection of the twist of the crankshaft is determined as follows: a division angle of the pin is used as a management index, and the acceptance or rejection is determined by whether or not this management index is within a specification (for example, within ±1°).

Further, acceptance or rejection of the shape of the counterweight is determined using side dimensions (width, height, outer diameter) of the counterweight viewed from the direction of the rotation center axis of the crankshaft as illustrated in FIG. 1A as a management index. This management index is necessary to ensure the rotational balance of the crankshaft. Further, regarding the acceptance or rejection of the shape of the counterweight, the longitudinal positions of the counterweight viewed from the direction orthogonal to the rotation center axis of the crankshaft as illustrated in FIG. 1B are also used as a management index. This management index is necessary to detect the thickness (dimension along the rotation axis direction) or tilt of the counterweight. Each tolerance is determined for the above-described management indexes relating to the shape of the counterweight (for example, ±1 mm, ±2 mm).

Further, regarding the acceptance or rejection of the shape of the shaft portion, a forging thickness and forging die mismatch that enable a grasp of the accuracy of die forging are used as a management index in the manufacturing process.

A conventional method to inspect the crankshaft is as follows: templates formed to match with reference shapes of the pin and the counterweight are each put on the pin and the counterweight of the crankshaft to be inspected, to measure the gap between the template and the pin and the gap between the template and the counterweight with a scale, and if the dimensions of the gaps (shape errors) are each in an allowable range, the crankshaft is determined as acceptance. This method is performed manually by an operator using the templates formed to match with the reference shapes of the pin and the counterweight, thus not only causing individual differences in inspection accuracy, but also requiring a long time for inspection. Therefore, various crankshaft shape inspection methods have been proposed as described in Patent Literatures 1 to 6 in order to perform automatic and accurate inspections.

CITATION LIST

Patent Literature

Patent Literature 1: Japanese Laid-open Patent Publication No. 59-184814

Patent Literature 2: Japanese Laid-open Patent Publication No. 06-265334

Patent Literature 3: Japanese Laid-open Patent Publication No. 10-62144

Patent Literature 4: Japanese Laid-open Patent Publication No. 2007-212357

Patent Literature 5: International Publication Pamphlet No. WO2016/194728

Patent Literature 6: International Publication Pamphlet No. WO2017/159626

SUMMARY OF INVENTION

Technical Problem

The surface of the crankshaft immediately after shot blasting has a metallic luster. There is a concern that this metallic luster may cause noise when measuring the three-dimensional shape of the crankshaft for the crankshaft shape inspection, leading to degradation in measurement accuracy. If the noise is caused near the counterweight, the side dimensions or the longitudinal positions of the counterweight may fail to be calculated accurately.

The conventional shape inspection methods have not been proposed to enable accurate calculation of the shape of the crankshaft having a metallic luster on the surface immediately after shot blasting, especially, the side dimensions and the longitudinal positions of the counterweight.

The present invention has been made in order to solve the problems of the conventional techniques described above, and an object thereof is to enable accurate calculation of side dimensions and longitudinal positions of a counterweight of a crankshaft.

Solution to Problem

The crankshaft shape inspection method of the present invention includes:

an acquisition step that acquires three-dimensional point cloud data of a surface of a crankshaft by a three-dimensional shape measuring device measuring a surface shape of the crankshaft;

a generation step that generates, while using the three-dimensional point cloud data acquired at the acquisition step, first point cloud data based on point cloud data generated by performing isolated point removal processing that removes data points whose distance to the nearest neighbor data point is equal to or more than a first threshold value and generates second point cloud data based on point cloud data generated by performing isolated point removal processing that removes data points whose distance to the nearest neighbor data point is equal to or more than a second threshold value that is larger than the first threshold value; and a calculation step that extracts, based on the first point cloud data and the second point cloud data generated at the generation step, counterweight point cloud data, which are point cloud data of a counterweight of the crankshaft, calculates a side dimension of the counterweight using the counterweight point cloud data extracted from the first point cloud data, and calculates a longitudinal position of the counterweight using the counterweight point cloud data extracted from the second point cloud data.

The arithmetic unit of the present invention includes being an arithmetic unit intended for inspecting a shape of a crankshaft, the arithmetic unit includes:

an acquisition means that acquires three-dimensional point cloud data of a surface of the crankshaft based on a result obtained by a three-dimensional shape measuring device measuring a surface shape of the crankshaft;

a generation means that generates, while using the three-dimensional point cloud data acquired by the acquisition means, first point cloud data based on point cloud data generated by performing isolated point removal processing that removes data points whose distance to the nearest neighbor data point is equal to or more than a first threshold value and generates second point cloud data based on point cloud data generated by performing isolated point removal processing that removes data points whose distance to the nearest neighbor data point is equal to or more than a second threshold value that is larger than the first threshold value; and a calculation means that extracts, based on the first point cloud data and the second point cloud data generated by the generation means, counterweight point cloud data, which are point cloud data of a counterweight of the crankshaft, calculates a side dimension of the counterweight using the counterweight point cloud data extracted from the first point cloud data, and calculates a longitudinal position of the counterweight using the counterweight point cloud data extracted from the second point cloud data.

The program of the present invention being a program intended for inspecting a shape of a crankshaft, the program causes a computer to execute:

an acquisition means that acquires three-dimensional point cloud data of a surface of the crankshaft based on a result obtained by a three-dimensional shape measuring device measuring a surface shape of the crankshaft;

a generation means that generates, while using the three-dimensional point cloud data acquired by the acquisition means, first point cloud data based on point cloud data generated by performing isolated point removal processing that removes data points whose distance to the nearest neighbor data point is equal to or more than a first threshold value and generates second point cloud data based on point cloud data generated by performing isolated point removal processing that removes data points whose distance to the nearest neighbor data point is equal to or more than a second threshold value that is larger than the first threshold value; and a calculation means that extracts, based on the first point cloud data and the second point cloud data generated by the generation means, counterweight point cloud data, which are point cloud data of a counterweight of the crankshaft, calculates a side dimension of the counterweight using the counterweight point cloud data extracted from the first point cloud data, and calculates a longitudinal position of the counterweight using the counterweight point cloud data extracted from the second point cloud data.

The crankshaft shape inspection apparatus of the present invention includes:

a plurality of optical three-dimensional shape measuring devices that are arranged around a rotation center axis of a crankshaft, and measure a three-dimensional shape of the crankshaft by projecting and receiving light on and from the crankshaft while relatively moving in a direction parallel to the rotation center axis of the crankshaft; and an arithmetic unit that receives measurement results obtained by a plurality of the three-dimensional shape measuring devices and executes a predetermined arithmetic operation, wherein at least some of the three-dimensional shape measuring devices are arranged to be inclined to make light projection directions different from each other with respect to a direction orthogonal to the rotation center axis of the crankshaft, and the arithmetic unit includes:

an acquisition means that acquires three-dimensional point cloud data of a surface of the crankshaft based on results obtained by the three-dimensional shape measuring devices measuring a surface shape of the crankshaft;

a generation means that generates, while using the three-dimensional point cloud data acquired by the acquisition means, first point cloud data based on point cloud data generated by performing isolated point removal processing that removes data points whose distance to the nearest neighbor data point is equal to or more than a first threshold value and generates second point cloud data based on point cloud data generated by performing isolated point removal processing that removes data points whose distance to the nearest neighbor data point is equal to or more than a second threshold value that is larger than the first threshold value; and a calculation means that extracts, based on the first point cloud data and the second point cloud data generated by the generation means, counterweight point cloud data, which are point cloud data of a counterweight of the crankshaft, calculates a side dimension of the counterweight using the counterweight point cloud data extracted from the first point cloud data, and calculates a longitudinal position of the counterweight using the counterweight point cloud data extracted from the second point cloud data.

Advantageous Effects of Invention

According to the present invention, it is possible to accurately calculate the side dimensions and the longitudinal positions of a counterweight of a crankshaft.

BRIEF DESCRIPTION OF DRAWINGS

FIG. 2B is a diagram illustrating a functional configuration of an arithmetic unit according to the embodiment.

FIG. 2C is a flowchart illustrating pieces of processing to be executed by the arithmetic unit according to the embodiment.

FIG. 3A is a view illustrating a schematic configuration of the crankshaft shape inspection apparatus according to the embodiment.

FIG. 3B is a view illustrating a schematic configuration of the crankshaft shape inspection apparatus according to the embodiment.

FIG. 5A is a view illustrating one example of three-dimensional point cloud data acquired at an acquisition step of a crankshaft shape inspection method according to an embodiment.

FIG. 5B is a view illustrating one example of the three-dimensional point cloud data acquired at the acquisition step of the crankshaft shape inspection method according to the embodiment.

FIG. 9A is an explanatory view explaining the moving step of the crankshaft shape inspection method according to the embodiment.

FIG. 9B is an explanatory view explaining the moving step of the crankshaft shape inspection method according to the embodiment.

FIG. 11 is an explanatory view explaining a width and heights of a counterweight.

FIG. 15 is an explanatory view explaining a bend of the crankshaft.

FIG. 16A is an explanatory view explaining a forging thickness of the crankshaft.

FIG. 16B is an explanatory view explaining forging die mismatch of the crankshaft.

DESCRIPTION OF EMBODIMENTS

There will be explained one example of the present invention below with reference to the accompanying drawings appropriately.

Figure 1A:
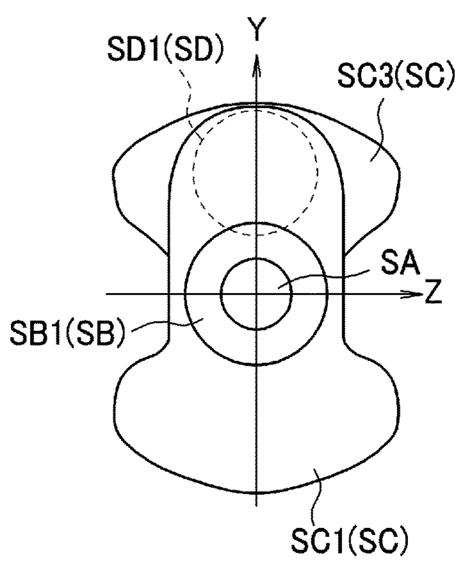
FIG. 1A is a view schematically illustrating one example of a crankshaft.
Figure 1B:
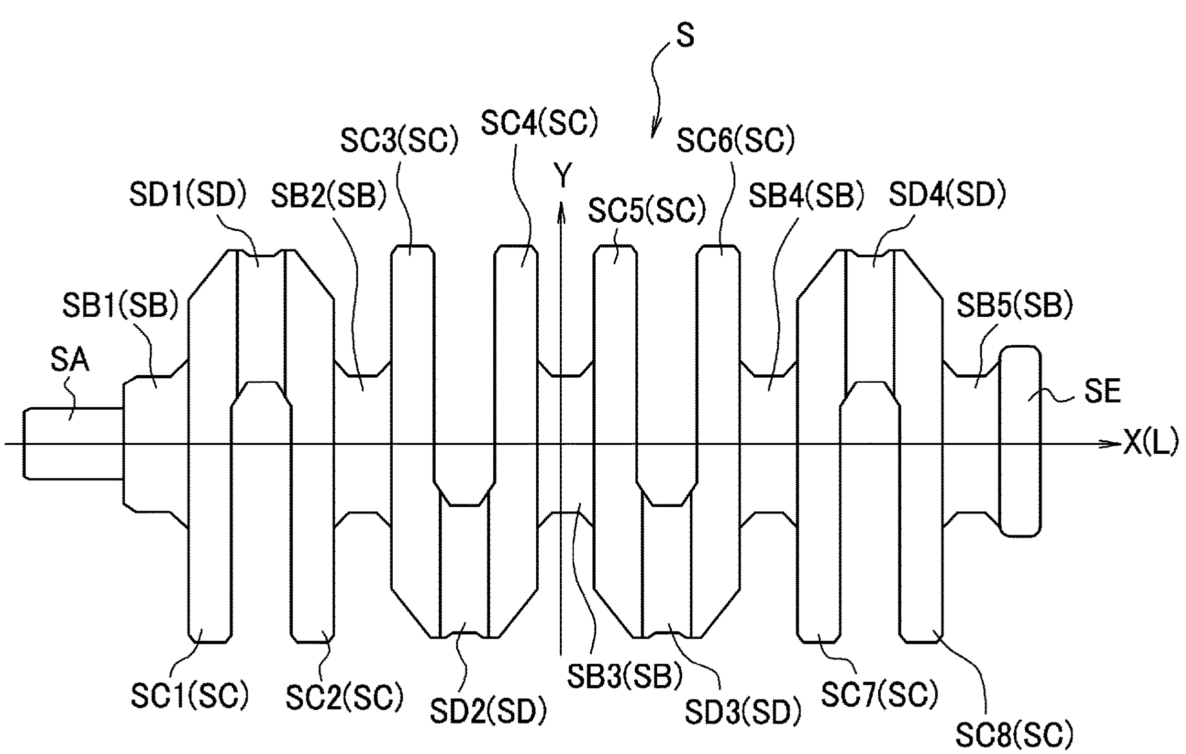
FIG. 1B is a view schematically illustrating one example of the crankshaft.
Figure 2A:
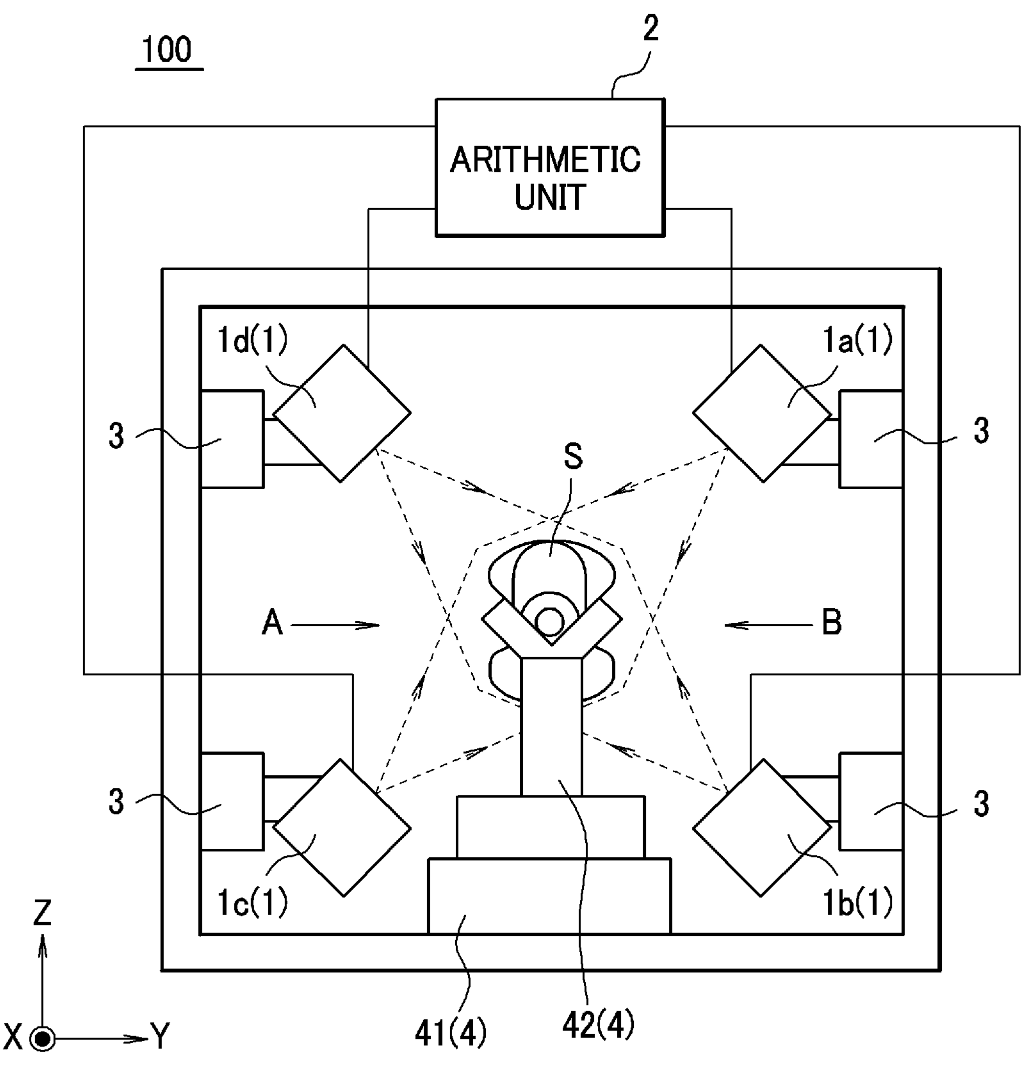
FIG. 2A is a view illustrating a schematic configuration of a crankshaft shape inspection apparatus according to an embodiment.
Figure 4:
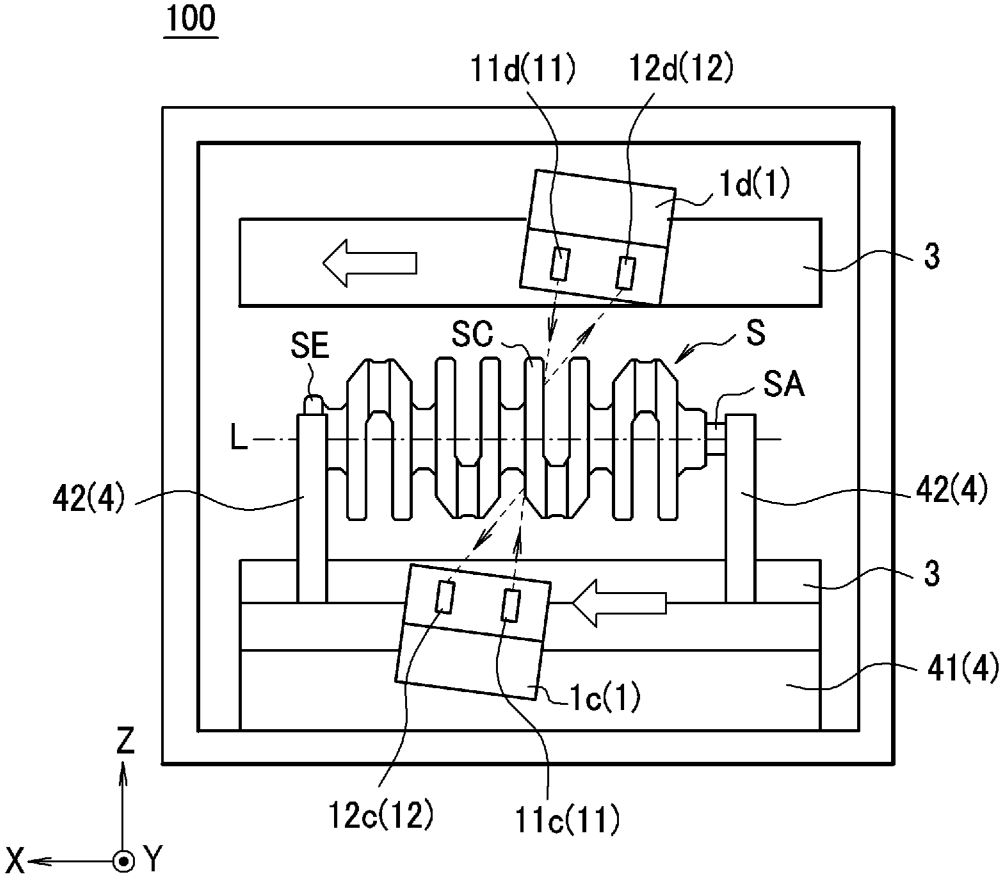
FIG. 4 is a view illustrating a schematic configuration of the crankshaft shape inspection apparatus according to the embodiment.

FIG. 2A to FIG. 4 are views illustrating a schematic configuration of a crankshaft shape inspection apparatus 100 according to an embodiment (to be simply referred to as a "shape inspection apparatus" below). FIG. 2A is a front perspective view of the shape inspection apparatus 100 viewed from the direction of a rotation center axis (X-axis direction) of a crankshaft S (crankshaft for inline four-cylinder engine). FIG. 2B is a diagram illustrating a functional configuration of an arithmetic unit 2. FIG. 2C is a flowchart illustrating pieces of processing to be executed by the arithmetic unit 2. FIG. 3A is a side view viewed from the direction indicated by an arrow A in FIG. 2A. FIG. 3B is a partial enlarged side view of FIG. 3A. FIG. 4 is a side view viewed from the direction indicated by an arrow B in FIG. 2A. Incidentally, the direction parallel to a rotation center axis L of the crankshaft S when the crankshaft S is not bent or twisted is set to an X-axis direction, the horizontal direction orthogonal to the rotation center axis L of the crankshaft S is set to a Y-axis direction, and the vertical direction orthogonal to the rotation center axis L of the crankshaft S is set to a Z-axis direction. Further, in FIG. 3A, FIG. 3B, and FIG. 4, the illustration of the arithmetic unit 2 is omitted.

As illustrated in FIG. 2A to FIG. 4, the shape inspection apparatus 100 includes optical three-dimensional shape measuring devices 1, the arithmetic unit 2, positioning devices 3, and a support device 4.

The three-dimensional shape measuring device 1 is a device that measures the three-dimensional shape of the crankshaft S by projecting and receiving light on and from the crankshaft S. Specifically, the three-dimensional shape measuring device 1 includes a light-projecting unit 11 that projects linear laser light extending in the direction orthogonal to the rotation center axis L of the crankshaft S toward the crankshaft S, and a light-receiving unit 12 that receives light reflected on the surface of the crankshaft S and captures an image, and is configured to measure the three-dimensional shape of the crankshaft S by an optical cutting method that analyzes the deformation of the linear laser light. However, in applying the present invention, the three-dimensional shape measuring device is not limited to this, and can also employ a configuration to measure the three-dimensional shape of the crankshaft S using a spatial encoding method by projecting a stripe pattern or a grid pattern.

The three-dimensional shape measuring device 1 is arranged, for example, at a position inclined by an angle β with respect to the plane orthogonal to the direction of the rotation center axis of the crankshaft S (the X-axis direction), and when the distance to the crankshaft S is 400 mm, the measurement field of view in the circumferential direction of the crankshaft S is 180 mm. Further, the measurement resolution of the crankshaft S in the circumferential direction is 0.3 mm, and the measurement resolution of the crankshaft S in the radial direction when the measurement cycle is 500 Hz is about 0.02 mm. As such a three-dimensional shape measuring device 1, for example, an ultra-high-speed in-line profilometer "LJ-V7300" manufactured by KEYENCE CORPORATION can be used. When the three-dimensional shape measuring device 1 is moved at 200 mm/sec in the X-axis direction by the later-described positioning device 3, it is possible to measure the three-dimensional shape of the crankshaft S in which the measurement resolution in the X-axis direction (the axial direction of the crankshaft S) is 0.4 mm, the measurement resolution of the crankshaft S in the circumferential direction is 0.3 mm, and the measurement resolution of the crankshaft S in the radial direction is 0.02 mm.

The shape inspection apparatus 100 includes, as the three-dimensional shape measuring device 1, four three-dimensional shape measuring devices 1*a* to 1*d* arranged around the rotation center axis L of the crankshaft S at a pitch of 90°. The three-dimensional shape measuring device 1*a* includes a light-projecting unit 11*a* and a light-receiving unit 12*a*, the three-dimensional shape measuring device 1*b* includes a light-projecting unit 11*b* and a light-receiving unit 12*b*, the three-dimensional shape measuring device 1*c* includes a light-projecting unit 11*c* and a light-receiving unit 12*c*, and the three-dimensional shape measuring device 1*d* includes a light-projecting unit 11*d* and a light-receiving unit 12*d*. The four three-dimensional shape measuring devices 1*a* to 1*d* are provided in this manner, thereby making it possible to measure the three-dimensional shape of the entire crankshaft S without rotating the crankshaft S around the rotation center axis L.

Then, among the four three-dimensional shape measuring devices 1*a* to 1*d*, the three-dimensional shape measuring devices adjacent to each other around the rotation center axis L of the crankshaft S have their light projection directions inclined in opposite directions to each other with respect to the direction orthogonal to the rotation center axis L of the crankshaft S.

For example, as illustrated in FIG. 3B, the light projection direction from the light-projecting unit 11*a* of the three-dimensional shape measuring device 1*a* is inclined by the angle β toward the flange SE side with respect to a direction LV1 orthogonal to the rotation center axis L of the crankshaft S, while the light projection direction from the light-projecting unit 11*b* of the three-dimensional shape measuring device 1*b* adjacent to the three-dimensional shape measuring device 1*a* is inclined by the angle β toward the front SA side with respect to a direction LV2 orthogonal to the rotation center axis L of the crankshaft S. As can be seen by referring to FIG. 4, the light projection direction from the light-projecting unit 11*d* of the three-dimensional shape measuring device 1*d* adjacent to the three-dimensional shape measuring device 1*a* is inclined toward the front SA side (inclined by the angle β, which is not illustrated) with respect to the direction orthogonal to the rotation center axis L of the crankshaft S, while the light projection direction from the light-projecting unit 11*c* of the three-dimensional shape measuring device 1*c* adjacent to the three-dimensional shape measuring devices 1*b* and 1*d* is inclined toward the flange SE side (inclined by the angle β, which is not illustrated) with respect to the direction orthogonal to the rotation center axis L of the crankshaft S.

As above, the light projection direction is inclined with respect to the direction orthogonal to the rotation center axis L of the crankshaft S, thereby making it possible to measure the shape of the side surface of the counterweight SC (the side surface in the direction orthogonal to the rotation center axis of the crankshaft S). Further, the light projection directions of the adjacent three-dimensional shape measuring devices 1 are inclined in opposite directions to each other with respect to the direction orthogonal to the rotation center axis L of the crankshaft S, thus making it possible to measure the shapes of both the side surfaces (the side surface on the front SA side and the side surface of the flange SE side) of the counterweight SC. When the angle β is 5°, the measurement pitch of the side surface of the counterweight SC in the Y-axis direction is 4.5 mm (=0.4 mm/tan 5°).

The arithmetic unit 2 executes predetermined arithmetic operations on the measurement result obtained by the three-dimensional shape measuring device 1. Specifically, as illustrated in FIG. 2B, the arithmetic unit 2 includes an acquisition unit 21, a generation unit 22, a moving unit 23, and a calculation unit 24.

The acquisition unit 21 generates (acquires) three-dimensional point cloud data of the surface of the crankshaft S based on the result obtained by the three-dimensional shape measuring device 1 measuring the surface shape of the crankshaft S.

The generation unit 22 generates first point cloud data based on point cloud data generated by performing isolated point removal processing that removes data points whose distance to the nearest neighbor data point is equal to or more than a first threshold value Th1 while using the three-dimensional point cloud data acquired by the acquisition unit 21. Further, the generation unit 22 generates second point cloud data based on point cloud data generated by performing isolated point removal processing that removes data points whose distance to the nearest neighbor data point is equal to or more than a second threshold value that is larger than the first threshold value Th1 while using the three-dimensional point cloud data acquired by the acquisition unit 21.

The moving unit 23 moves the first point cloud data and the second point cloud data generated by the generation unit 22 to match with a coordinate system used when the crankshaft S is machined.

The calculation unit 23 extracts counterweight point cloud data, which are point cloud data of the counterweight SC of the crankshaft S, based on the first point cloud data and the second point cloud data moved by the moving unit 23. Then, the calculation unit 23 calculates the side dimension of the counterweight SC using the counterweight point cloud data extracted from the first point cloud data and calculates the longitudinal position of the counterweight SC using the counterweight point cloud data extracted from the second point cloud data.

The arithmetic unit 2 is configured by a computer device including, for example, a CPU, a ROM, a RAM, and so on, and its functions are achieved by the CPU executing a predetermined program. Specifically, for example, by mounting a well-known point cloud processing library such as open-source "PCL (Point Cloud Library)" or "HALCON" manufactured by MVTec Software GmbH on a computer device, the arithmetic unit 2 can be configured. The above-described point cloud processing library can handle surface data (data formed of a cylinder, a plane, a triangular mesh, and the like) in addition to the point cloud data, and can execute various operations relating to point cloud data and surface data, such as pieces of preprocessing such as smoothing and thinning processing, extraction of point cloud data based on coordinates or distances, coordinate conversion, matching processing, fitting processing, dimension measurement of point cloud data, and generation of three-dimensional surfaces. The later-described isolated point removal processing can also be executed by the above-described point cloud processing library.

Further, a surface shape model of the crankshaft S prepared in advance based on design specifications of the crankshaft S is stored in the arithmetic unit 2. Specifically, three-dimensional CAD data based on the design specifications are input to the arithmetic unit 2, and the arithmetic unit 2 converts the input CAD data into a surface shape model formed of a triangular mesh or the like and stores the model. The surface shape model only needs to be created and stored for each type of the crankshaft S, and thus, when the same type of the crankshaft S is continuously inspected, there is no need to create a surface shape model for each inspection.

The positioning device 3 relatively moves the three-dimensional shape measuring device 1 in the X-axis direction parallel to the rotation center axis L of the crankshaft S. As the positioning device 3, for example, a uniaxial stage can be used. As the uniaxial stage used for the positioning device 3, the one capable of performing positioning or grasping a position with a resolution of 0.1 mm or less is preferred. In this embodiment, the positioning device 3 is provided for each of the three-dimensional shape measuring devices 1 in order to move the four three-dimensional shape measuring devices 1 independently.

Incidentally, although the positioning device 3 is to move the three-dimensional shape measuring device 1, it is not necessarily limited to this, and a mechanism to move the crankshaft S in the X-axis direction can also be used. The three-dimensional shape of the entire crankshaft S can be measured by projecting and receiving light on and from the crankshaft S while the three-dimensional shape measuring device 1 moving relatively in the X-axis direction.

Incidentally, if measurement positions of the four three-dimensional shape measuring devices 1*a* to 1*d* in the X-axis direction are close to each other, the lights projected from the respective three-dimensional shape measuring devices 1*a* to 1*d* may interfere with each other, causing erroneous measurements. Therefore, for example, the four positioning devices 3 move the three-dimensional shape measuring devices 1*a* to 1*d* respectively so that the three-dimensional shape measuring devices 1*a* to 1*d* are spaced about 200 mm apart in the X-axis direction.

The support device 4 includes a base 41 and a pair of support parts 42 extending from both ends of the base 41 in the Z-axis direction respectively. One of the support parts 42 supports the front SA of the crankshaft S, and the other of the support parts 42 supports the flange SE of the crankshaft S. The upper ends of the support parts 42 are V-shaped, which allows the crankshaft S to be supported in a stable posture. Incidentally, as the three-dimensional shape measuring device 1, the positioning device 3, and the support device 4 included in the shape inspection apparatus 100 according to this embodiment, it is possible to employ the same configurations as those of the shape inspection apparatus, the mobile device, and the support device described in Patent Literature 6, respectively, and thus further detailed explanations are omitted here.

Further, this embodiment is designed to include the four three-dimensional shape measuring devices 1*a* to 1*d*, but five or more three-dimensional shape measuring devices may be provided to measure the three-dimensional shape of the crankshaft S.

The following explains a shape inspection method of the crankshaft S using the shape inspection apparatus 100 having the above-described configuration.

The shape inspection method according to this embodiment includes an acquisition step, an isolated point removal step, a superposition step, a moving step, and a calculation step. As illustrated in FIG. 2C, the arithmetic unit 2 executes the acquisition step at Step S1, executes the isolated point removal step at Step S2, executes the superposition step at Step S3, executes the moving step at Step S4, and executes the calculation step at Step S5. Each step will be explained sequentially below.

<Acquisition Step>

At the acquisition step, the three-dimensional shape measuring device 1 measures the surface shape of the crankshaft S, and thereby three-dimensional point cloud data of the surface of the crankshaft S are acquired.

Specifically, the crankshaft S is placed on the support device 4, and the positioning devices 3 move the four three-dimensional shape measuring devices 1*a* to 1*d* to the front SA side in the X-axis direction. Then, the three-dimensional shape of the crankshaft S is measured by projecting and receiving lights on and from the crankshaft S while the positioning devices 3 moving the four three-dimensional shape measuring devices 1*a* to 1*d* to the flange SE side in the X-axis direction. On this occasion, in order to prevent the lights projected from the respective three-dimensional shape measuring devices 1*a* to 1*d* from interfering with each other and causing erroneous measurements, for example, the positioning devices 3 move the three-dimensional shape measuring devices 1*a* to 1*d* respectively so that the three-dimensional shape measuring devices 1*a* to 1*d* are spaced about 200 mm apart in the X-axis direction. For example, when moving the three-dimensional shape measuring devices 1*a* to 1*d* at 200 mm/s, the three-dimensional shape measuring devices 1*a* to 1*d* are each moved with a delay of 1 sec. The maximum length of the crankshaft S is about 700 mm in the case where the crankshaft S is for three- to six-cylinder engines, and thus, it is possible to acquire the three-dimensional point cloud data over the entire length of the crankshaft S within 8 seconds, even if the moving distance is 800 mm.

The three-dimensional point cloud data over the entire length of the crankshaft S acquired as described above are input to and stored in the arithmetic unit 2 via Ethernet (registered trademark) or other means. The acquisition unit 21 in the arithmetic unit 2 generates (acquires) three-dimensional point cloud data of the entire surface of the crankshaft S by combining the measurement results obtained by the four three-dimensional shape measuring devices 1*a* to 1*d*.

FIG. 5A and FIG. 5B are views illustrating one example of the three-dimensional point cloud data acquired at the acquisition step. FIG. 5A illustrates one example of three-dimensional point cloud data acquired for the crankshaft S with a rusted surface. FIG. 5B illustrates one example of three-dimensional point cloud data acquired for the crankshaft S whose surface immediately after shot blasting has a metallic luster. Incidentally, FIG. 5A. and FIG. 5B also illustrate three-dimensional point cloud data of a positioning target used when combining the measurement results obtained by the four three-dimensional shape measuring devices 1*a* to 1*d* or for another purpose, and this positioning target exhibits the same function as that described in Patent Literature 6, and thus, its detailed explanation is omitted here.

As illustrated in FIG. 5B, in the three-dimensional point cloud data acquired for the crankshaft S whose surface immediately after shot blasting has a metallic luster, noises (data points surrounded by a dashed line), which do not occur in the three-dimensional point cloud data acquired for the crankshaft S with a rusted surface illustrated in FIG. 5A, occur near the counterweight. These noises will degrade the accuracy of measuring the shape of the counterweight.

Figure 6:
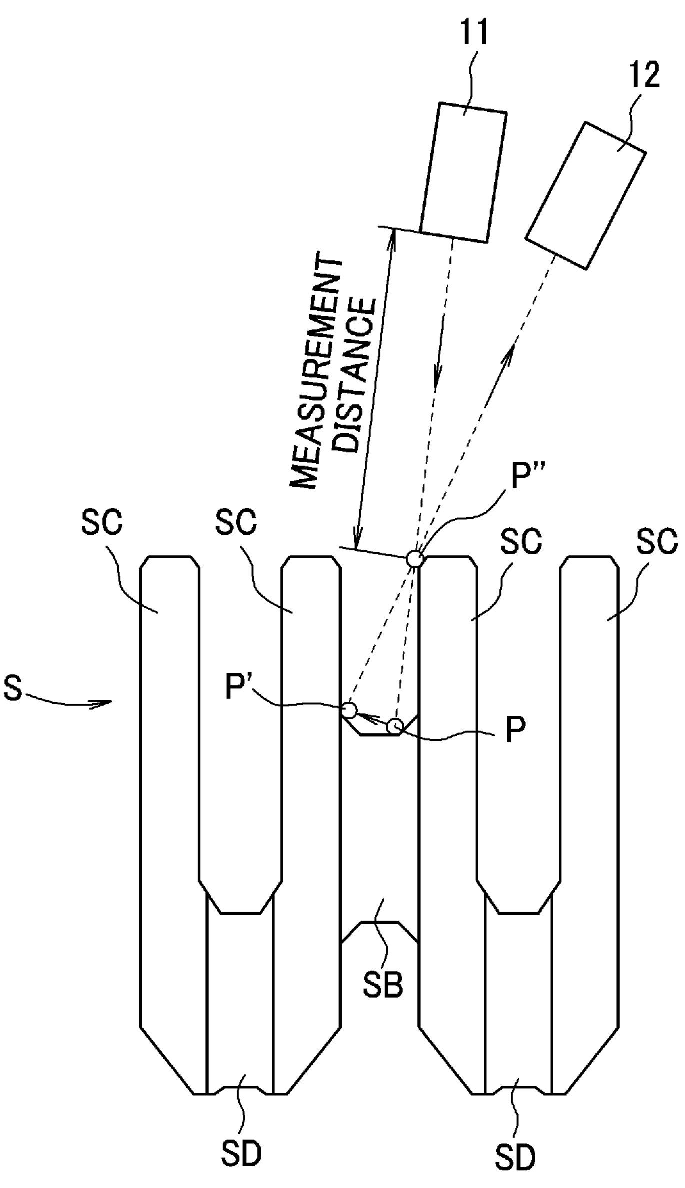
FIG. 6 is an explanatory view explaining the cause of noise.

FIG. 6 is an explanatory view explaining the cause of the above-described noise. A point P of the journal SB is irradiated with laser light projected from the light-projecting unit 11 illustrated in FIG. 6. The point P is located in the blind spot of the light-receiving unit 12 due to the adjacent counterweight SC on the right side in FIG. 6, and thus the light reflected at the point P is not directly received by the light-receiving unit 12. However, light specularly reflected at the point P of the journal SB is further specularly reflected at a point P' on the side surface of the adjacent counterweight SC on the left side in FIG. 6 to be received by the light-receiving unit 12 as stray light in some cases. In this case, the distance from the light-projecting unit 11 is measured as if the point P existed at a position P" (the point where the light-projecting axis of the light-projecting unit 11 and the light-receiving axis of the light-receiving unit 12 intersect) illustrated in FIG. 6. It was found out that the surface of the crankshaft S immediately after shot blasting has a metallic luster, and thus the above-described stray light has a high intensity and may be acquired as part of the three-dimensional point cloud data of the surface of the crankshaft S.

As measures to reduce the noise caused by the above-described stray light, reducing the intensity of the laser light projected from the light-projecting unit 11 or increasing a detection threshold value of the light in the light-receiving unit 12 is also conceivable. However, such measures make it even more difficult to measure the shape of a portion where the intensity of reflected light is originally low, such as the side surface of the counterweight SC. Thus, in this embodiment, instead of taking measures against the light-projecting unit 11 and the light-receiving unit 12, measures to reduce noise are employed by acquiring three-dimensional point cloud data that contain noise caused by stray light and then performing the isolated point removal processing on the three-dimensional point cloud data at the later-described isolated point removal step.

<Isolated Point Removal Step>

At the isolated point removal step, the generation unit 22 in the arithmetic unit 2 generates basic data of first point cloud data by performing, on the three-dimensional point cloud data acquired at the acquisition step, isolated point removal processing that removes data points whose distance to the nearest neighbor data point is equal to or more than the first threshold value Th1, and at the same time, generates basic data of second point cloud data by performing, on the three-dimensional point cloud data acquired at the acquisition step, isolated point removal processing that removes data points whose distance to the nearest neighbor data point is equal to or more than the second threshold value Th2 (>the first threshold value Th1).

Specifically, regarding the basic data of the first point cloud data, the generation unit 22 concatenates, of the three-dimensional point cloud data, point cloud data whose distance to the nearest neighbor data point is less than the first threshold value Th1 as one cluster, and performs labeling processing on each cluster. Then, the generation unit 22 calculates the number of data points and the dimension (the distance between outermost data points) of each of the labeled clusters, removes small clusters (for example, clusters each having 10 or smaller data points and a dimension of 10 mm or less), and combines only the remaining large clusters. Through such processing, only the data points (data points forming small clusters) located at a distance equal to or more than the first threshold value Th1 other than the original three-dimensional point cloud data (large clusters) corresponding to the surface of the crankshaft S are removed. The same is true for the basic data of the second point cloud data, except that the second threshold value Th2 is used as a threshold value.

Here, when the measurement pitch of the three-dimensional point cloud data in the longitudinal direction (the direction parallel to the rotation center axis L of the crankshaft S) is set to Δx, the point cloud data of the circumferential surface of the counterweight SC used for calculating the side dimensions such as the width, the height, and the outer diameter of the counterweight SC are generated at a pitch of Δx in the X-axis direction, but the point cloud data of the side surface of the counterweight used for calculating the longitudinal position of the counterweight SC are generated at a pitch of Δx/tan(abs(β)) in the Y-axis direction. Incidentally, abs(β) means the absolute value of β. Accordingly, in order to reduce the effect of noise caused by stray light, it is preferable to use the basic data of the first point cloud data generated using the first threshold value Th1 that satisfies Expression (1) below when calculating the side dimension of the counterweight SC, and use the basic data of the second point cloud data generated using the second threshold value Th2 that satisfies Expression (2) below when calculating the longitudinal position of the counterweight SC.

$$\Delta x < Th1 < 4\Delta x \quad (1)$$

$$\Delta x / \tan(\mathrm{abs}(\beta)) < Th2 \quad (2)$$

When the angle β=5° is established, Expression (2) becomes 11.4Δx<Th2, and when the angle β=10° is established, Expression (2) becomes 5.7Δx<Th2. Since the angle β is usually set to about several degrees, Th1 that satisfies Expression (1) and Th2 that satisfies Expression (2) establish a relationship of Th1>Th2. For example, when Δx=0.4 mm and β=5° are established, 0.4 mm<Th1<1.6 mm and 4.5 mm<Th2 are established.

Figure 7A:
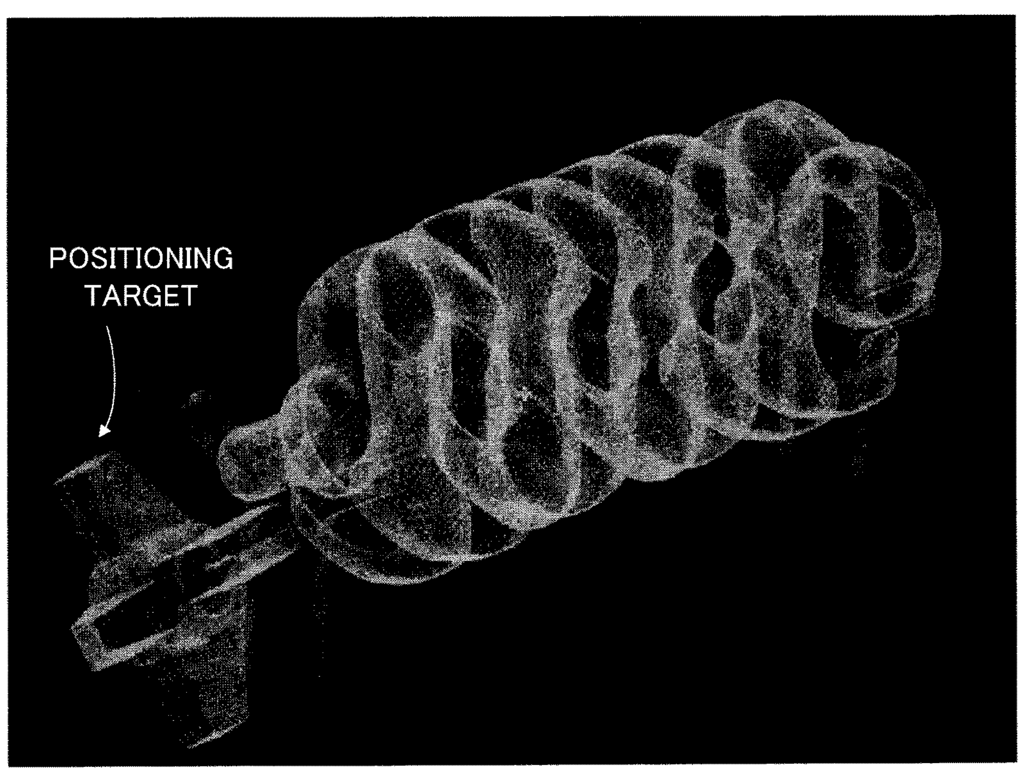
FIG. 7A is a view illustrating one example of basic data of first point cloud data generated at an isolated point removal step of the crankshaft shape inspection method according to the embodiment.
Figure 7B:
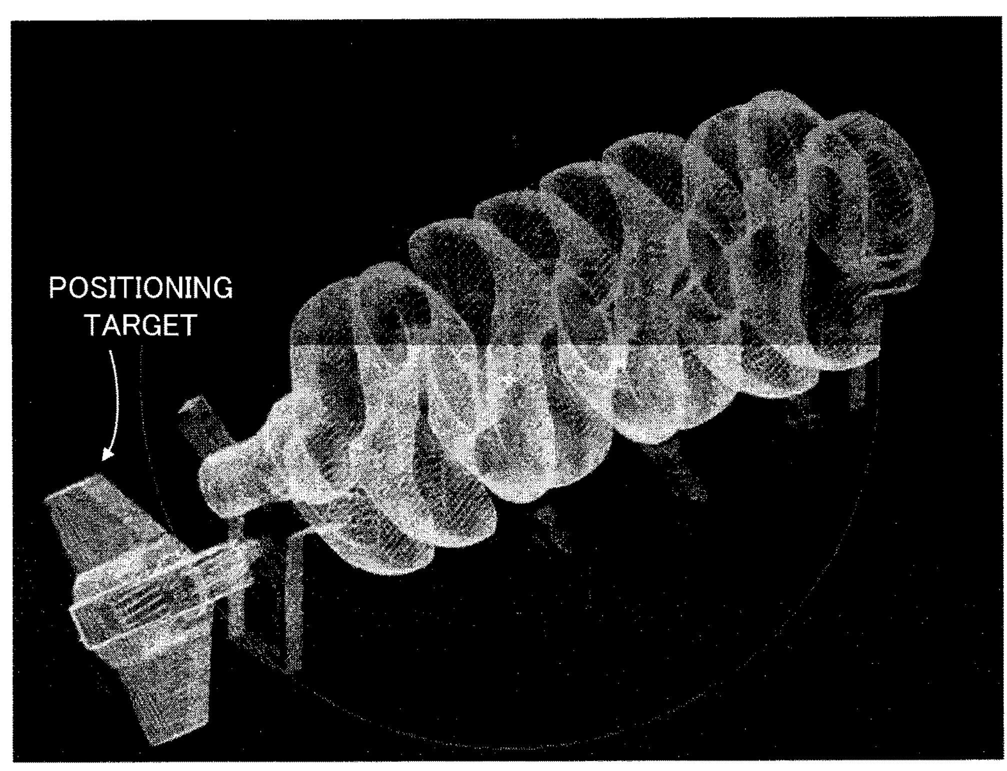
FIG. 7B is a view illustrating one example of basic data of second point cloud data generated at the isolated point removal step of the crankshaft shape inspection method according to the embodiment.

FIG. 7A and FIG. 7B are views illustrating examples of the basic data of the first point cloud data and the basic data of the second point cloud data that are generated at the isolated point removal step. FIG. 7A illustrates the basic data of the first point cloud data generated with the first threshold value Th1=1.0 mm for the crankshaft S whose surface immediately after shot blasting has a metallic luster. FIG. 7B illustrates the basic data of the second point cloud data generated with the second threshold value Th2=10 mm for the crankshaft S whose surface immediately after shot blasting has a metallic luster. As illustrated in FIG. 7A, the basic data of the first point cloud data generated with the small first threshold value Th1 have no noises at all near the counterweight SC and the noises are completely removed, although part of the point cloud data of the side surface of the counterweight SC is missing. On the other hand, as illustrated in FIG. 7B, the basic data of the second point cloud data generated with the second threshold value Th2 contain enough point cloud data of the side surface of the counterweight SC, but the noises remain near the counterweight SC.

As above, according to the findings obtained by the present inventors, in the case of the crankshaft S whose surface immediately after shot blasting has a metallic luster, data points other than the original three-dimensional point cloud data corresponding to the surface of the crankshaft S may be generated in the three-dimensional point cloud data acquired at the acquisition step, in a manner to be isolated from the original three-dimensional point cloud data, and these isolated data points are the cause of degradation of measurement accuracy. Therefore, the isolated point removal processing is performed on the three-dimensional point cloud data, thereby making it possible to inhibit the degradation of the measurement accuracy. Particularly, the basic data of the first point cloud data from which the data points whose distance to the nearest neighbor data point (the data point closest to the data point of interest) is equal to or more than the first threshold value Th1 are removed are generated, and at the same time, the basic data of the second point cloud data from which the data points whose distance to the nearest neighbor data point is equal to or more than the second threshold value Th2 (>the first threshold value Th1) are removed are generated. According to the findings obtained by the present inventors, the basic data of the first point cloud data are effective in accurately calculating the side dimensions (such as the width, the height, and the outer diameter) of the counterweight SC, and the basic data of the second point cloud data are effective in accurately calculating the longitudinal position of the counterweight SC (the position in the direction parallel to the rotation center axis of the crankshaft).

<Superposition Step>

At the superposition step, the generation unit 22 in the arithmetic unit 2 translates and rotates the basic data of the first point cloud data and the basic data of the second point cloud data as illustrated in FIG. 7A and FIG. 7B, which are generated at the isolated point removal step, to make the distance between the basic data of the first point cloud data and the basic data of the second point cloud data and the surface shape model of the crankshaft S minimum, and sets the data made by superposing the basic data of the first point cloud data and the basic data of the second point cloud data on the surface shape model as the first point cloud data and the second point cloud data. That is, the generation unit 22 translates and rotates the basic data of the first point cloud data and the basic data of the second point cloud data to make the sum of the distances between the respective data points constituting the basic data of the first point cloud data and the basic data of the second point cloud data and the surface shape model, or the sum of the sum of the squared distances minimum, and superposes them on the surface shape model.

<Moving Step>

At the moving step, the moving unit 23 in the arithmetic unit 2 extracts from the first point cloud data and the second point cloud data superposed on the surface shape model at the superposition step, machining reference portion point cloud data, which are point cloud data of a predetermined machining reference portion, and translates and rotates the first point cloud data and the second point cloud data to make the coordinates of the machining reference determined by the aforementioned extracted machining reference portion point cloud data match with the coordinates predetermined in the coordinate system used when the crankshaft S is machined.

Figure 8A:
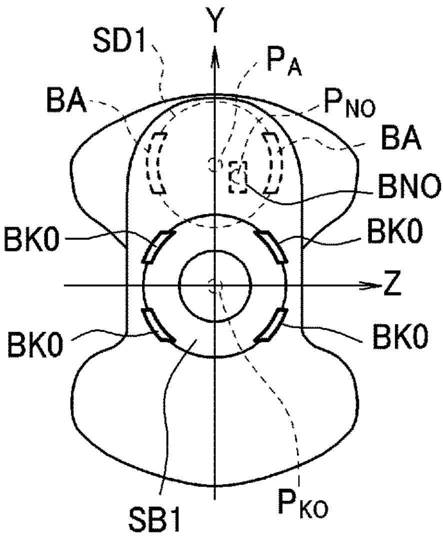
FIG. 8A is an explanatory view explaining an moving step of the crankshaft shape inspection method according to the embodiment.
Figure 10:
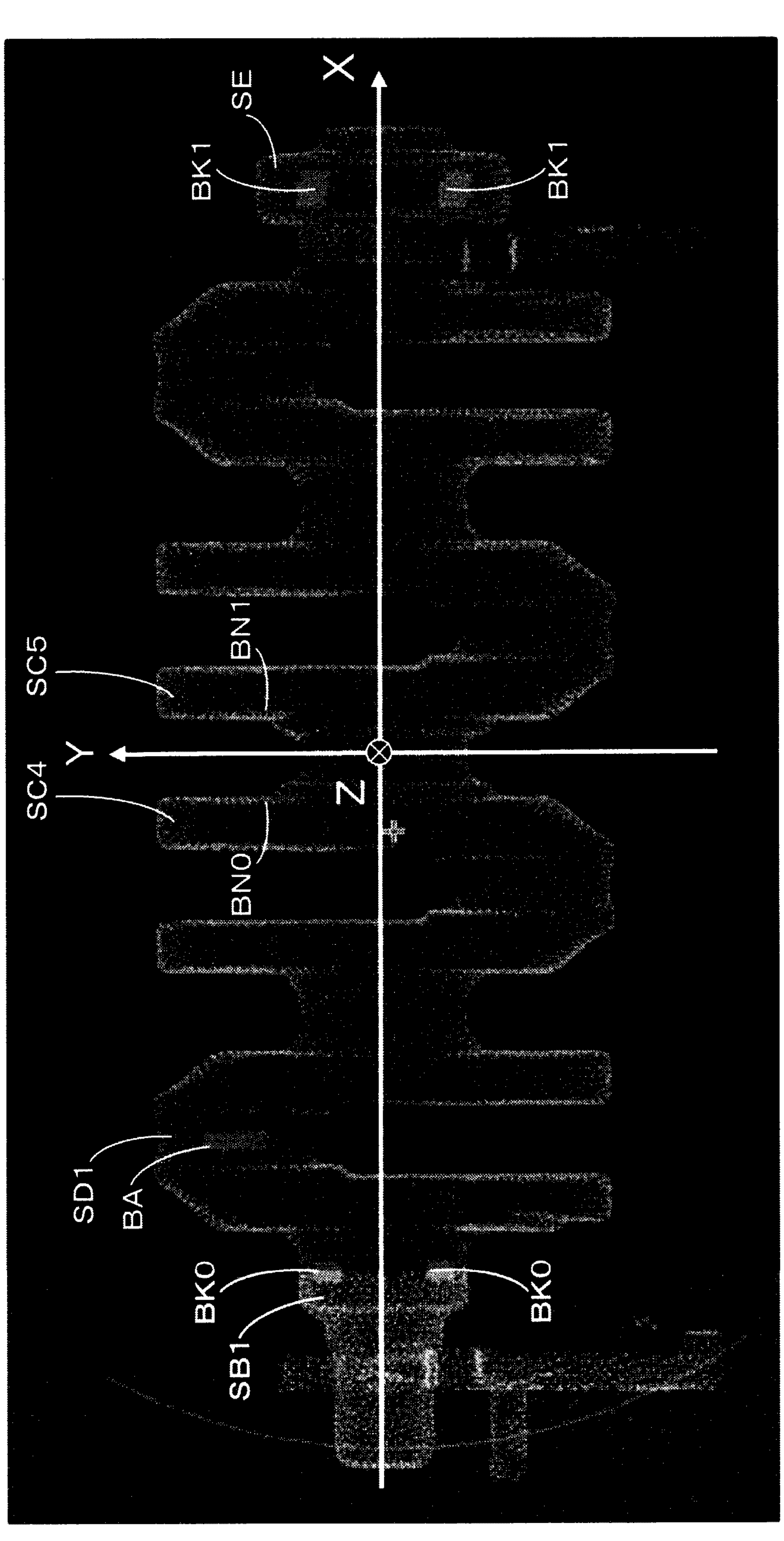
FIG. 10 is an explanatory view explaining the moving step of the crankshaft shape inspection method according to the embodiment.

FIG. 8A to FIG. 10 are explanatory views explaining the moving step. FIG. 8A is a front view of the crankshaft S viewed from the direction of the rotation center axis L when the crankshaft S is not bent or twisted, and FIG. 8B is a side view of the crankshaft S viewed from the direction orthogonal to the rotation center axis L, which corresponds to FIG. 8A. FIG. 9A is a front view of the crankshaft S viewed from the direction of the rotation center axis L when the crankshaft S is bent or twisted, and FIG. 9B is a side view of the crankshaft S viewed from the direction orthogonal to the rotation center axis L, which corresponds to FIG. 9A. FIG. 10 is a view illustrating one example of the first point cloud data or the second point cloud data of the crankshaft S viewed from the direction orthogonal to the rotation center axis L.

As illustrated in FIG. 8A to FIG. 10, in this embodiment, as the machining reference portion, of the crankshaft S, two shaft portions (specifically, a first journal SB1 and the flange SE), one pin (specifically, a first pin SD1), and two adjacent counterweights (specifically, a fourth counterweight SC4 and a fifth counterweight SC5) are set. Further, as the machining reference, centers $P_{K0}$ and $P_{K1}$ of the respective two shaft portions (the first journal SB1 and the flange SE), a center $P_A$ of the pin (the first pin SD1), and facing side surfaces $P_{N0}$ and $P_{N1}$ of the two counterweights (the fourth counterweight SC4 and the fifth counterweight SC5) (side surfaces orthogonal to the rotation center axis of the crankshaft S and facing in the direction of the rotation center axis of the crankshaft S) are set.

Specifically, at the moving step, the moving unit 23 extracts, as the machining reference portion point cloud data for the two shaft portions (the first journal SB1 and the flange SE) of the crankshaft S, which are the machining reference portions, point cloud data BK0 and BK1 of the portions that fixing chucks (specifically, centering chucks not illustrated) for fixing the crankshaft S come into contact with. The point cloud data BK0 are pieces of point cloud data at four portions, in the circumferential direction, of the first journal SB1 that jaws of the fixing chuck come into contact with, and the positions can be recognized from the surface shape model superposed on the first point cloud data and the second point cloud data. Similarly, the point cloud data BK1 are pieces of point cloud data at four portions, in the circumferential direction, of the flange SE that jaws of the fixing chuck come into contact with, and the positions can be recognized from the surface shape model superposed on the first point cloud data and the second point cloud data. In practice, the ranges of the point cloud data BK0 and BK1 each are set slightly larger to include the vicinity of the position recognized from the surface shape model. By setting the range to be slightly larger, it is possible to improve the calculation accuracy of the center of a cylinder in fitting processing to be described later.

Incidentally, using the first point cloud data is preferable to extract the point cloud data BK0 and BK1.

Then, the moving unit 23 performs fitting processing for fitting a cylinder on each of four pieces of the extracted point cloud data BK0 and four pieces of the extracted point cloud data BK1, calculates the center of the fitted cylinder, and sets this calculated center to the center $P_{K0}$ and $P_{K1}$ of the two shaft portions (the first journal SB1 and the flange SE), which are the machining reference. The moving unit 23 translates and rotates the first point cloud data and the second point cloud data to make the coordinates of the machining references $P_{K0}$ and $P_{K1}$ match with the predetermined coordinates in the coordinate system (XYZ coordinate system in FIG. 8A to FIG. 10) used when the crankshaft S is machined. Specifically, when the coordinates of the machining references $P_{K0}$ and $P_{K1}$ in the coordinate system used when the crankshaft S is machined are set to $P_{K0}$ ($x_{k0}$, $y_{k0}$, $z_{k0}$) and $P_{K1}$ ($x_{k1}$, $y_{k1}$, $z_{k1}$) respectively, the amount of translation in the Y-axis direction is set to $y_T$, the rotation angle around the Y axis is set to $y_R$ [rad], the amount of translation in the Z-axis direction is set to $z_T$, and the rotation angle around the Z axis is set to $z_R$ [rad], the moving unit 23 translates and rotates the first point cloud data and the second point cloud data according to Equations (3) to (6) below so that the machining references $P_{R0}$ and $P_{K1}$ are located on the X axis.

$$y_T=(x_{K0}\cdot y_{K1}-y_{K0}\cdot x_{K1})/(x_{K0}-x_{K1}) \quad (3)$$

$$z_T=(x_{K0}\cdot z_{K1}-y_{K0}\cdot x_{K1})/(x_{K0}-x_{K1}) \quad (4)$$

$$y_R=-180/\pi\cdot\tan^{-1}((z_{K1}-z_{K0})/(x_{K1}-x_{K0})) \quad (5)$$

$$z_R=180/\pi\cdot\tan^{-1}((y_{K1}-y_{K0})/(x_{K1}-x_{K0})) \quad (6)$$

Further, at the moving step, the moving unit 23 extracts, as the machining reference portion point cloud data for the single pin (the first pin SD1) of the crankshaft S, which is the machining reference portion, point cloud data BA of the portion that a fixing chuck (specifically, a phase clamp not illustrated) for fixing the crankshaft S comes into contact with. The point cloud data BA are pieces of point cloud data at two portions, in the circumferential direction, of the first pin SD1 that jaws of the fixing chuck come into contact with, and the positions can be recognized from the surface shape model superposed on the first point cloud data and the second point cloud data. In practice, the range of the point cloud data BA is set slightly larger to include the vicinity of the position recognized from the surface shape model. By setting the range to be slightly larger, the center of the first pin SD1 can be calculated with high accuracy even if the actual angle or position of the first pin SD1 deviates and thereby the actual contact position of the fixing chuck deviates from the designed position.

Incidentally, using the first point cloud data is preferable to extract the point cloud data BA.

Then, the moving unit 23 calculates intermediate coordinates z A between the largest Z-axis coordinates and the smallest Z-axis coordinates of two pieces of the extracted point cloud data BA to find the center $P_A(x_A, y_A, z_A)$ of the single pin (the first pin SD1) that is the machining reference. Here, $x_A$ and $y_A$ are the X-axis coordinates to be the center in the X-axis direction and the Y-axis coordinates to be the center in the Y-axis direction, respectively, in the shape of the first pin SD1 determined by the design specifications. The moving unit 23 rotates the first point cloud data and the second point cloud data to make the coordinates of the machining reference $P_A$ match with the predetermined coordinates in the coordinate system (XYZ coordinate system in FIG. 8A to FIG. 10) used when the crankshaft S is machined. Specifically, when the coordinates of the machining reference $P_A$ in the coordinate system used when the crankshaft S is machined are set to $P_A$ ($x_A$, $y_A$, $z_A$) and the rotation angle around the X axis is set to $X_R$ [rad], the moving unit 23 rotates the first point cloud data and the second point cloud data according to Equation (7) below so that the machining reference $P_A$ is located within the XY plane.

$$x_R=180/\pi\cdot\tan^{-1}(z_A/y_A) \quad (7)$$

Further, at the moving step, the moving unit 23 extracts, as the machining reference portion point cloud data for the two adjacent counterweights (the fourth counterweight SC4 and the fifth counterweight SC5) of the crankshaft S, which are the machining reference portions, point cloud data BN0 and BN1 at two portions of the facing side surfaces. The positions of the point cloud data BN0 and BN1 can be recognized from the surface shape model superposed on the first point cloud data and the second point cloud data. In practice, the range of the point cloud data BN0 and BN1 is set slightly larger to include the vicinity of the position recognized from the surface shape model. By setting the range to be slightly larger, even if the longitudinal position of the counterweight SC deviates, the longitudinal position can be calculated as long as it is within the set range.

Incidentally, using the second point cloud data is preferable to extract the point cloud data BN0 and BN1.

Then, the moving unit 23 calculates the average value of the X-axis coordinates for each of two pieces of the extracted point cloud data BN0 and BN1, and the points with these calculated X-axis coordinates are set to the facing side surfaces $P_{N0}$ and $P_{N1}$ of the two counterweights that are the machining references. The moving unit 23 translates the first point cloud data and the second point cloud data to make the coordinates of the machining references $P_{N0}$ and $P_{N1}$ match with the predetermined coordinates in the coordinate system (XYZ coordinate system in FIG. 8A to FIG. 10) used when the crankshaft S is machined. Specifically, when the X-axis coordinates of the machining references $P_{N0}$ and $P_{N1}$ in the coordinate system used when the crankshaft S is machined are set to $x_{N0}$ and $x_{N1}$ respectively and the amount of translation in the X-axis direction is set to $x_T$, the moving unit 23 translates the first point cloud data and the second point cloud data according to Equation (8) below so that the machining references $P_{N0}$ and $P_{N1}$ are located within the YZ plane.

$$x_T=-(x_{N0}+x_{N1})/2 \quad (8)$$

Figure 8B:
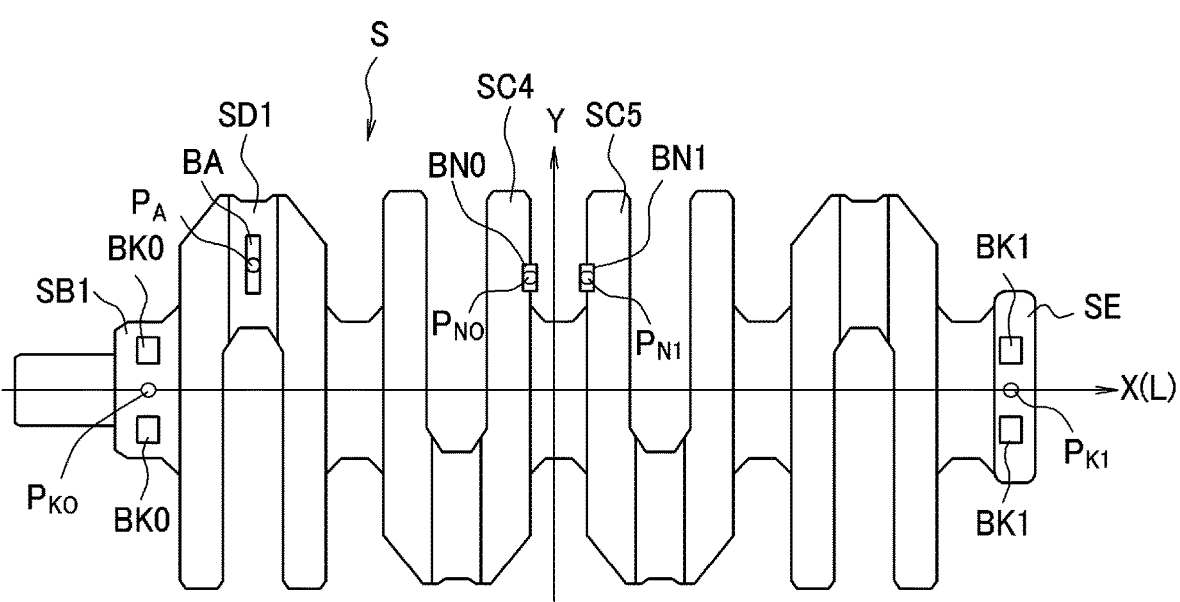
FIG. 8B is an explanatory view explaining the moving step of the crankshaft shape inspection method according to the embodiment.

As illustrated in FIG. 8A and FIG. 8B, when the crankshaft S is not bent or twisted, even if the moving step is executed, the first point cloud data and the second point cloud data are not translated or rotated, or the amount of movement is slight. In contrast to this, as illustrated in FIG. 9A and FIG. 9B, when the crankshaft S is bent or twisted, by executing the moving step, the first point cloud data and the second point cloud data are translated and rotated to make the dashed line illustrated near the Y axis in FIG. 9A (the straight line passing through the machining references $P_{K0}$ and $P_A$ viewed from the X-axis direction) match with the Y axis, and make the dashed line illustrated near the X axis in FIG. 9B (the rotation center axis L of the crankshaft S passing through the machining references $P_{K0}$ and $P_{K1}$ viewed from the Z-axis direction) match with the X axis.

As above, by executing the moving step, from the first point cloud data and the second point cloud data, the machining reference portion point cloud data, which are the point cloud data of the predetermined machining reference portions (such as the two shaft portions of the crankshaft S), are extracted. The position of the machining reference portion point cloud data can be recognized from the surface shape model, and the positions of the machining reference portion point cloud data in the first point cloud data and the second point cloud data can also be recognized because the first point cloud data and the second point cloud data are superposed on the surface shape model at the superposition step. Therefore, the machining reference portion point cloud data can be extracted from the first point cloud data and the second point cloud data.

Then, by executing the moving step, the first point cloud data and the second point cloud data are translated and rotated to make the coordinates of the machining references (such as the centers of the two shaft portions of the crankshaft S) determined by the extracted machining reference portion point cloud data match with the coordinates predetermined in the coordinate system used when the crankshaft S is machined. This allows the first point cloud data and the second point cloud data of the crankshaft S to be represented in the coordinate system used when the crankshaft S is machined, in other words, the state of the crankshaft S at the time of machining can be reproduced.

<Calculation Step>

At the calculation step, the calculation unit 24 in the arithmetic unit 2 extracts counterweight point cloud data, which are point cloud data of the counterweight SC of the crankshaft S, from each of the first point cloud data and the second point cloud data moved at the moving step. The position of the counterweight point cloud data can be recognized in the coordinate system at the time of machining, and the positions of the counterweight point cloud data in the first point cloud data and the second point cloud data can also be recognized because the moving step is executed and thereby the first point cloud data and the second point cloud data are represented in the coordinate system used when the crankshaft S is machined.

Then, at the calculation step, the calculation unit 24 calculates the side dimension of the counterweight SC using the counterweight point cloud data extracted from the first point cloud data and calculates the longitudinal position of the counterweight SC using the counterweight point cloud data extracted from the second point cloud data.

The following is a specific explanation of the side dimension and the longitudinal position of the counterweight SC to be calculated at the calculation step.

[Width W and heights $H_1$ and $H_2$ of the counterweight SC]

FIG. 11 is an explanatory view explaining a width W and heights $H_1$ and $H_2$ of the counterweight SC, which are one type of the side dimensions of the counterweight SC.

The calculation unit 24 rotates the counterweight point cloud data indicated by the dashed line in the left view of FIG. 11 about the X axis so that the counterweight SC is oriented in the positive direction of the Y axis. In the example illustrated in FIG. 11, the counterweight point cloud data are rotated by −180° (180° counterclockwise). The dashed line illustrated in the right view of FIG. 11 indicates the rotated counterweight point cloud data. Then, the calculation unit 24 extracts from the rotated counterweight point cloud data, point cloud data included in a predetermined width and height measurement range (for example, a range of ±10 mm of the reference position in the Y-axis direction), and calculates a maximum value $z_{max}$ and a minimum value $z_{min}$ of the Z-axis coordinates of the data points constituting the point cloud data.

Then, the calculation unit 24 calculates the width W of the counterweight SC by Equation (9) below, and calculates the heights $H_1$ and $H_2$ of the counterweight SC by Equations (10) and (11) below.

$$W=z_{max}-z_{min} \quad (9)$$

$$H_1=\mathrm{abs}(z_{max}) \quad (10)$$

$$H_2=\mathrm{abs}(z_{min}) \quad (11)$$

In Equation (10) above, abs($z_{max}$) means the absolute value of $z_{max}$. In Equation (11) above, abs($z_{min}$) means the absolute value of $z_{min}$.

[Outer Diameter R of the Counterweight SC]

Figure 12:
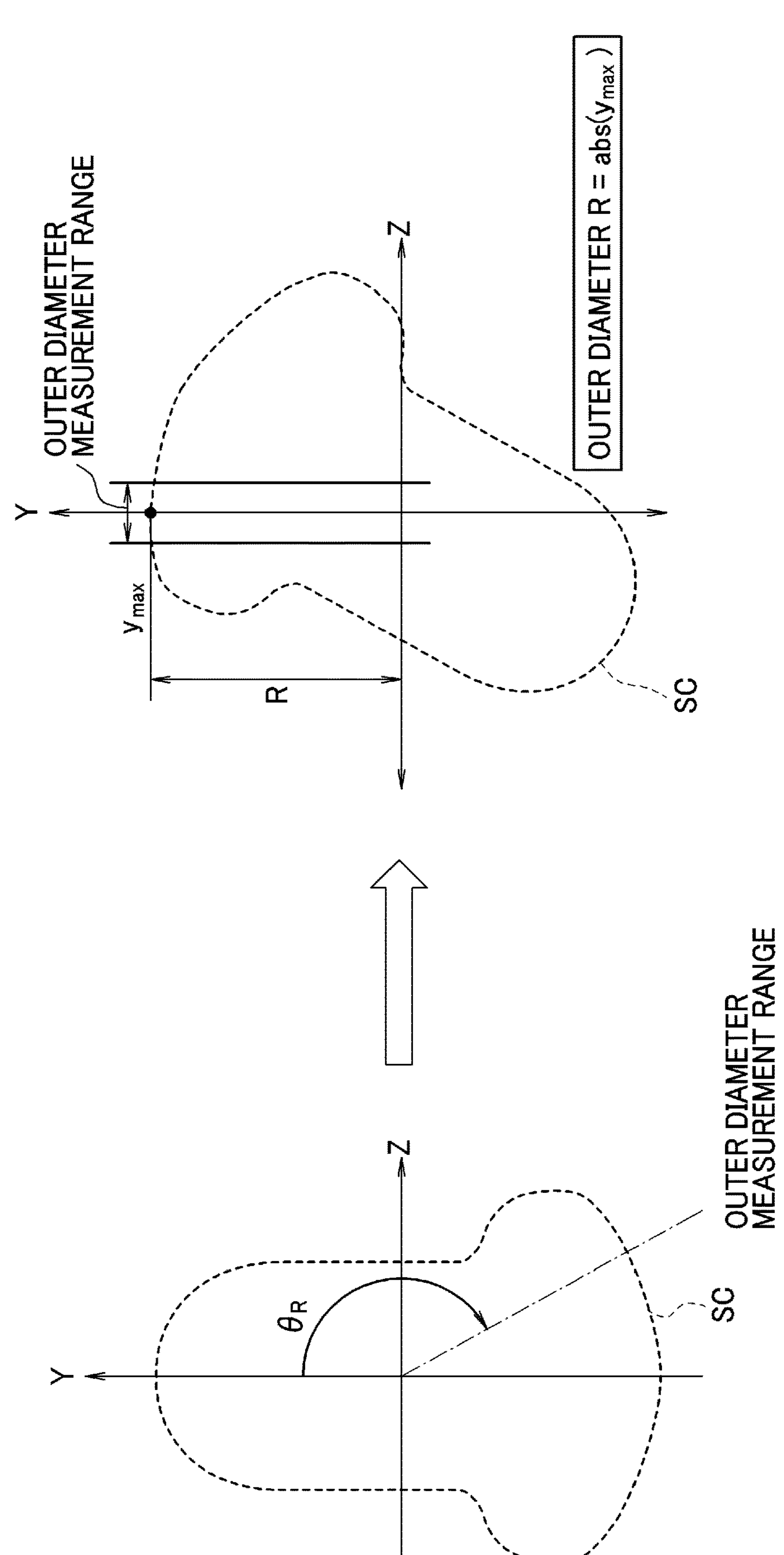
FIG. 12 is an explanatory view explaining an outer diameter of the counterweight.

FIG. 12 is an explanatory view explaining an outer diameter R of the counterweight SC, which is one type of the side dimensions of the counterweight SC.

The calculation unit 24 rotates the counterweight point cloud data illustrated by the dashed line in the left view of FIG. 12, around the X axis so that the measurement direction of the predetermined outer diameter is oriented in the positive direction of the Y axis. In the example illustrated in FIG. 12, the counterweight point cloud data are rotated by —θR (−θR counterclockwise). The dashed line illustrated in the right view of FIG. 12 indicates the rotated counterweight point cloud data. Then, the calculation unit 24 extracts from the rotated counterweight point cloud data, point cloud data included in a predetermined outer diameter measurement range (for example, a range of 0±5 mm in the Z-axis direction), and calculates a maximum value y max of the Y-axis coordinates of the data points constituting the point cloud data.

Then, the calculation unit 24 calculates the outer diameter R of the counterweight SC by Equation (12) below.

$$R=\text{abs}(y_{max}) \tag{12}$$

In Equation (12) above, $\text{abs}(y_{max})$ means the absolute value of $y_{max}$.

[Longitudinal Positions $n_{FR}$ and $n_{FL}$ of the Counterweight SC]

Figure 13:
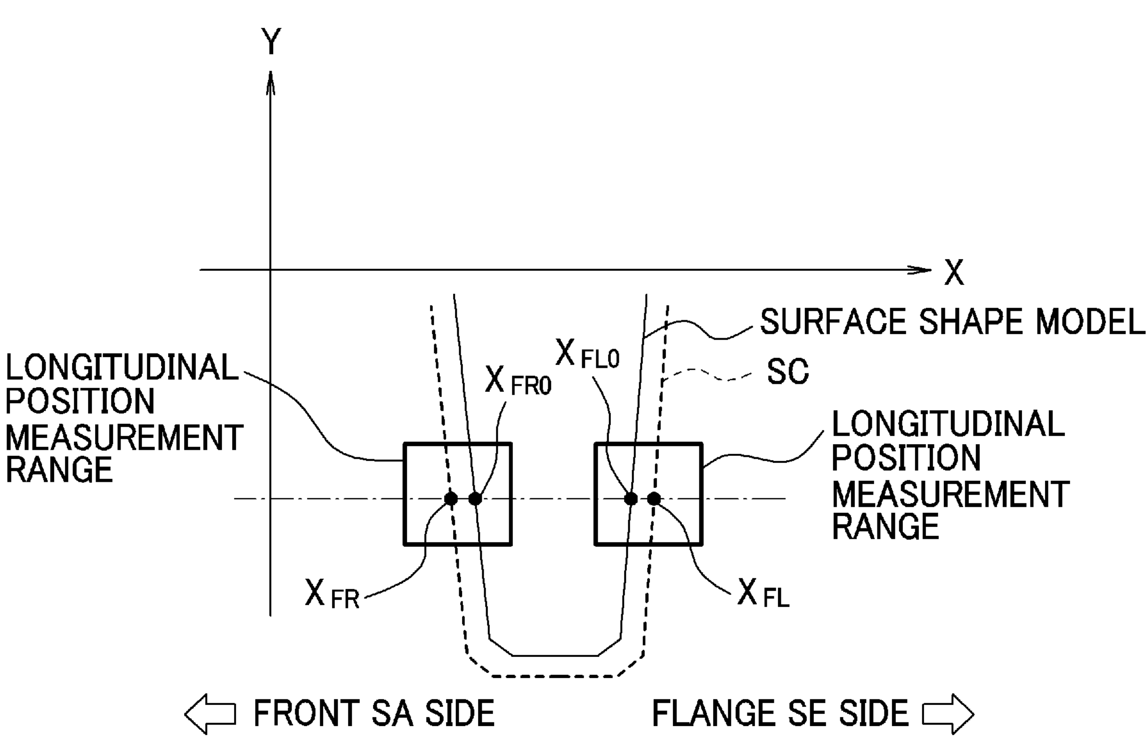
FIG. 13 is an explanatory view explaining longitudinal positions of the counterweight.

FIG. 13 is an explanatory view explaining longitudinal positions $n_{FR}$ and $n_{FL}$ of the counterweight SC.

The calculation unit 24 extracts from the counterweight point cloud data indicated by the dashed line in FIG. 13, point cloud data included in a predetermined longitudinal position measurement range (for example, a range of ±2.5 mm of the reference position in the X-axis direction, ±2.5 mm of the reference position in the Y-axis direction, and ±5 mm of the reference position in the Z-axis direction), and calculates the average value of the X-axis coordinates of the data points constituting the point cloud data. When the average value of the point cloud data located on the side surface of the counterweight SC on the front SA side is set to $x_{FR}$, the average value of the point cloud data located on the side surface of the counterweight SC on the flange SE side is set to $x_{FL}$, the X-axis coordinates of the side surface of the counterweight SC on the front SA side in the surface shape model is set to $x_{FR0}$, and the X-axis coordinates of the side surface of the counterweight SC on the flange SE side in the surface shape model is set to $x_{FL0}$, the calculation unit 24 calculates the longitudinal positions $n_{FR}$ and $n_{FL}$ of the counterweight SC by Equations (13) and (14) below.

$$n_{FR}=x_{FR0}-x_{FR} \tag{13}$$

$$n_{FL}=x_{FL}-X_{FL0} \tag{14}$$

The longitudinal positions $n_{FR}$ and $n_{FL}$ are values to be positive when the counterweight SC is thicker than the surface shape model (the dimension in the X-axis direction is larger).

Figure 14A:
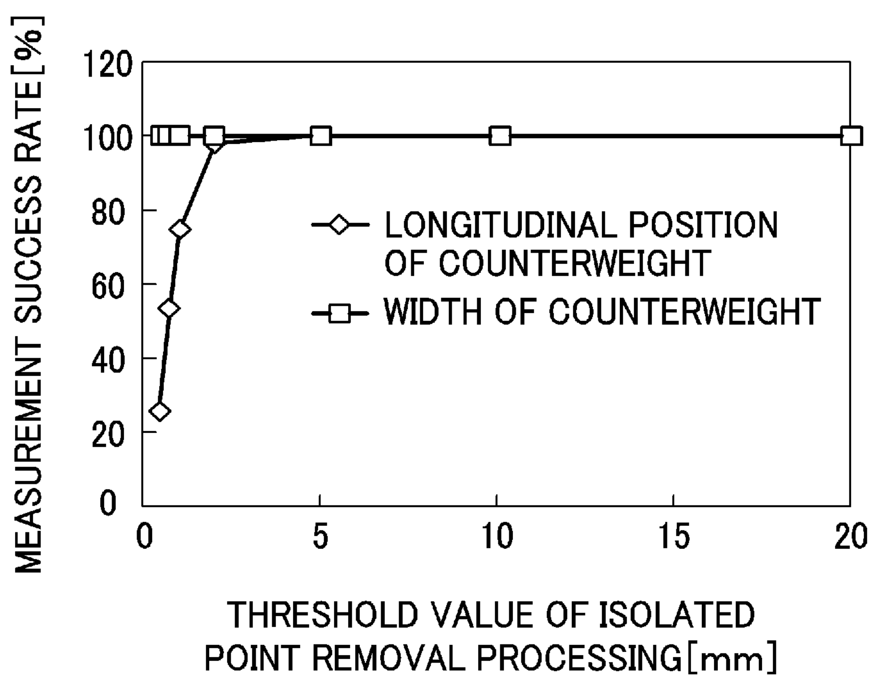
FIG. 14A illustrates one example of results obtained by examining the effect of a threshold value in isolated point removal processing on measurement success rates of width measurement and longitudinal position measurement of the counterweight.
Figure 14B:
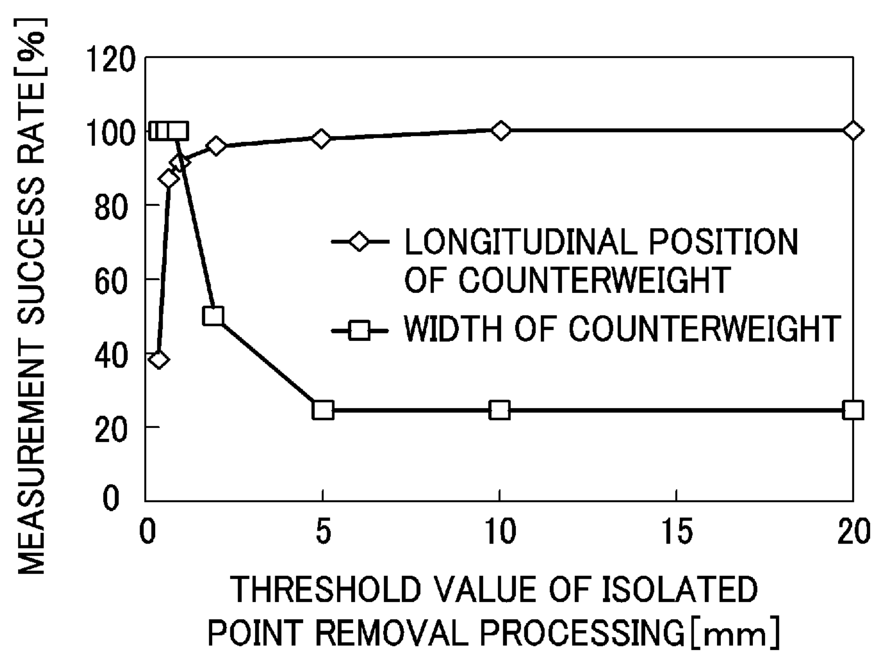
FIG. 14B illustrates one example of the results obtained by examining the effect of the threshold value in the isolated point removal processing on the measurement success rates of the width measurement and the longitudinal position measurement of the counterweight.

FIG. 14A and FIG. 14B illustrate examples of results obtained by examining the effect of the threshold value (the first threshold value Th1 or the second threshold value Th2) in the isolated point removal processing on measurement success rates of the width measurement and the longitudinal position measurement of the counterweight SC. FIG. 14A illustrates the result obtained for the crankshaft S with a rusted surface, and FIG. 14B illustrates the result obtained for the crankshaft S whose surface immediately after shot blasting has a metallic luster. In either case, using the good crankshaft S that was not bent or twisted, the widths of the eight counterweights SC and the longitudinal positions of the 24 portions were measured, and the percentage of the number of correct measurements made without any measurements failures or erroneous measurements was set as the measurement success rate.

As illustrated in FIG. 14A, in the case of the crankshaft S with a rusted surface, the noise due to stray light was not caused, and thus the width of the counterweight SC was able to be measured 100% regardless of the threshold value in the isolated point removal processing. On the other hand, regarding the longitudinal position of the counterweight SC, the measurement pitch of the side surface of the counterweight SC (the measurement pitch in the Y-axis direction) is 4.5 mm, and thus, the measurement success rate decreases as the threshold value becomes smaller than 5 mm.

Further, as illustrated in FIG. 14B, in the case of the crankshaft S whose surface has a metallic luster, as well, regarding the longitudinal position of the counterweight SC, the measurement success rate is the same as that of the crankshaft S with a rusted surface illustrated in FIG. 14A. On the other hand, regarding the width of the counterweight SC, the measurement success rate decreases when the threshold value exceeds 1 mm (2.5 times the measurement pitch ΔX=0.4 mm in the X-axis direction) because the noise caused by stray light is caused.

The above results reveal that as described above, it is preferable to use the first point cloud data generated using the first threshold value Th1 that satisfies Equation (1) when calculating the side dimension such as the width of the counterweight SC, and it is preferable to use the second point cloud data generated using the second threshold value Th2 that satisfies Equation (2) when calculating the longitudinal position of the counterweight SC.

As above, by executing the calculation step, the side dimension of the counterweight SC is calculated using the counterweight point cloud data extracted from the first point cloud data, the longitudinal position of the counterweight SC is calculated using the counterweight point cloud data extracted from the second point cloud data, and thereby, as are the above-described findings obtained by the present inventors, it is possible to accurately calculate the side dimension and the longitudinal position of the counterweight SC.

Incidentally, in this embodiment, the arithmetic unit 2 is configured to calculate not only the width, the height, the outer diameter, and the longitudinal position of the counterweight SC, but also other shapes of the crankshaft S. The following explains examples of other shapes that can be calculated by the arithmetic unit 2.

[Bend m]

FIG. 15 is an explanatory view explaining a bend m of the crankshaft S.

The arithmetic unit 2 extracts the point cloud data of the shaft portions (the front SA, the journal SB, and the flange SE) of the crankshaft S from the first point cloud data. As an example, the point cloud data of the journal SB are illustrated by a dashed line in FIG. 15.

Then, the arithmetic unit 2 performs fitting processing for fitting a cylinder on the extracted point cloud data of the shaft portion, and calculates a center C of the fitted cylinder. When the coordinates of the calculated center C are set to C ($x_C$, $y_C$, $z_C$), the arithmetic unit 2 calculates the bend m of the crankshaft by Equation (15) below.

$$m=(y_C^2+z_C^2)^{1/2} \tag{15}$$

[Forging Thickness T, Forging Die Mismatch $D_T$]

FIG. 16A and FIG. 16B are explanatory views explaining a forging thickness T and forging die mismatch D T of the crankshaft S. FIG. 16A is an explanatory view explaining the forging thickness T, and FIG. 16B is an explanatory view explaining the forging die mismatch $D_T$.

The arithmetic unit 2 extracts the point cloud data of the shaft portions (the front SA, the journal SB, and the flange SE) of the crankshaft S from the first point cloud data. As one example, the point cloud data of the journal SB are illustrated by a dashed line in FIG. 16A and FIG. 16B.

Then, as illustrated in FIG. 16A, the arithmetic unit 2 creates a rectangular parallelepiped that contains the extracted point cloud data of the shaft portion (a rectangular parallelepiped in which each surface constituting the rectangular parallelepiped is orthogonal to one of the X axis, the Y axis, and the Z axis), and calculates a maximum value $z_{max}$ and a minimum value z m in of the Z-axis coordinates of the rectangular parallelepiped. The arithmetic unit 2 calculates the forging thickness T of the crankshaft S by Equation (16) below.

$$T=z_{max}-z_{min} \quad (16)$$

Further, as illustrated in FIG. 16B, the arithmetic unit 2 rotates the point cloud data of the shaft portion illustrated in FIG. 16A by 45° around the X axis (45° clockwise) to create a rectangular parallelepiped that contains the rotated point cloud data of the shaft portion (a rectangular parallelepiped in which each surface constituting the rectangular parallelepiped is orthogonal to one of the X axis, the Y axis, and the Z axis), and calculates a maximum value $z_{max}$ and a minimum value $z_{min}$ of the Z-axis coordinates of the rectangular parallelepiped and a maximum value $y_{max}$ and a minimum value $y_{min}$ of the Y-axis coordinates of the rectangular parallelepiped. When $T_{+45}=z_{max}\ z_{min}$ is established and $T_{-45}=y_{max}-y_{min}$ is established, the arithmetic unit 2 calculates the forging die mismatch $D_T$ of the crankshaft S by Equation (17) below.

$$D_T=T_{+45}-T_{-45} \quad (17)$$

[Twist $\alpha_P$]

Figure 17:
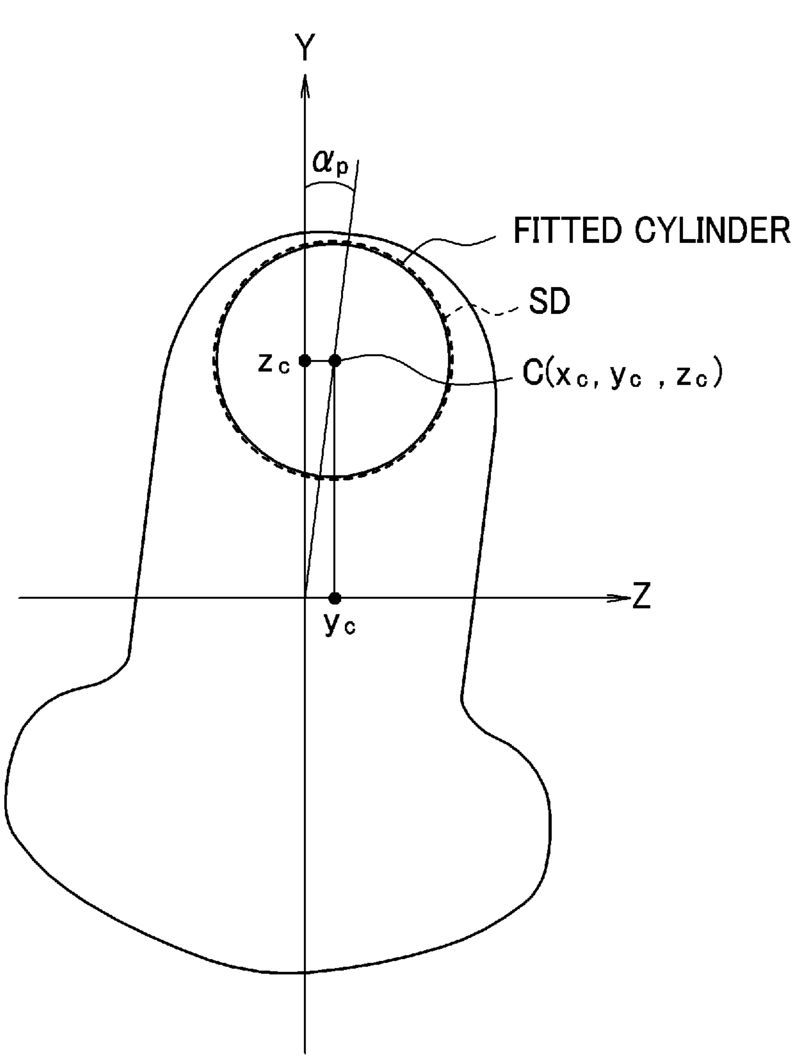
FIG. 17 is an explanatory view explaining a twist of the crankshaft.

FIG. 17 is an explanatory view explaining a twist αP of the crankshaft S.

The arithmetic unit 2 extracts the point cloud data of the pin SD of the crankshaft S from the first point cloud data. The point cloud data of the pin SD are illustrated by a dashed line in FIG. 17.

Then, the arithmetic unit 2 performs fitting processing for fitting a cylinder on the extracted point cloud data of the pin SD, and calculates a center C of the fitted cylinder. When the coordinates of the calculated center C are set to C ($x_C$, $y_C$, $z_C$), the arithmetic unit 2 calculates the twist $\alpha_P$ of the crankshaft by Formula (18) below.

[Mathematical formula 1]

$$\alpha_P[deg]=\begin{cases} +180/\pi\cdot\tan^{-1}(z_C/y_C) & (\text{if } y_C>0 \text{ and } z_C\geqq 0) \\ -180/\pi\cdot\tan^{-1}(z_C/y_C)+90 & (\text{if } y_C\leqq 0 \text{ and } z_C>0) \\ +180/\pi\cdot\tan^{-1}(z_C/y_C)+180 & (\text{if } y_C<0 \text{ and } z_C\leqq 0) \\ -180/\pi\cdot\tan^{-1}(z_C/y_C)+270 & (\text{if } y_C\geqq 0 \text{ and } z_C<0) \end{cases} \quad (18)$$

In the embodiment explained above, as a generation step that generates the first point cloud data and the second point cloud data, the generation unit 22 in the arithmetic unit 2 first executes the isolated point removal step and then executes the superposition step, but this order may be reversed. That is, the generation unit 22 in the arithmetic unit 2 may execute the superposition step of translating and rotating the three-dimensional point cloud data acquired at the acquisition step to make the distance between the three-dimensional point cloud data and the surface shape model minimum and superposing the three-dimensional point cloud data on the surface shape model, and the isolated point removal step of performing the isolated point removal processing that removes data points whose distance to the nearest neighbor data point is equal to or more than the first threshold value on the three-dimensional point cloud data superposed on the surface shape model at the superposition step, to generate the first point cloud data and at the same time, performing the isolated point removal processing that removes data points whose distance to the nearest neighbor data point is equal to or more than the second threshold value on the three-dimensional point cloud data superposed on the surface shape model at the superposition step, to generate the second point cloud data. "Make the distance to the surface shape model minimum" means that the sum of the distances between the data points constituting the three-dimensional point cloud data and the surface shape model, or the sum of the sum of the squared distances is made minimum.

Hereinbefore, the present invention has been described with an embodiment, but the above-described embodiment merely illustrates concrete examples of implementing the present invention, and the technical scope of the present invention is not to be construed in a restrictive manner by these embodiments. That is, the present invention may be implemented in various forms without departing from the technical spirit or main feature thereof.

The invention claimed is:

1. A crankshaft shape inspection method, comprising:

acquiring, by a computer processor including processing circuitry, three-dimensional point cloud data of a surface of a crankshaft by a three-dimensional shape measuring device measuring a surface shape of the crankshaft;

generating, by the computer processor, while using the three-dimensional point cloud data, first point cloud data based on point cloud data generated by performing isolated point removal processing that removes data points whose distance to the nearest neighbor data point is equal to or more than a first threshold value and second point cloud data based on point cloud data generated by performing isolated point removal processing that removes data points whose distance to the nearest neighbor data point is equal to or more than a second threshold value that is larger than the first threshold value; and extracting, by the computer processor, based on the first point cloud data and the second point cloud data, counterweight point cloud data, which are point cloud data of a counterweight of the crankshaft, calculating a side dimension of the counterweight using the counterweight point cloud data extracted from the first point cloud data, and calculating a longitudinal position of the counterweight using the counterweight point cloud data extracted from the second point cloud data, wherein generating, by the computer processor, the first point cloud data and the second point cloud data comprises generating, by the computer processor, first point cloud basic data by performing isolated point removal processing that removes data points whose distance to the nearest neighbor data point is equal to or more than the first threshold value on the three-dimensional point cloud data, and at the same time, generating second point cloud basic data by performing isolated point removal processing that removes data points whose distance to the nearest neighbor data point is equal to or more than the second threshold value on the three-dimensional point cloud data, and translating and rotating, by the computer processor, the first point cloud basic data and the second point cloud basic data to make distances between the first point cloud basic data and the second point cloud basic data and a surface shape model of the crankshaft prepared in advance based on design specifications of the crankshaft minimum and setting the first point cloud basic data and the second point cloud basic data superposed on the surface shape model to the first point cloud data and the second point cloud data.

2. The crankshaft shape inspection method according to claim 1, further comprising:

moving, by the computer processor, the first point cloud data and the second point cloud data generated at the generation step to match with a coordinate system used when the crankshaft is machined, wherein calculating, by the computer processor, the side dimension and the longitudinal position of the counterweight comprise, counterweight point cloud data, which are point cloud data of a counterweight of the crankshaft, are extracted from each of the first point cloud data and the second point cloud data that are moved, a side dimension of the counterweight is calculated using the counterweight point cloud data extracted from the first point cloud data, and a longitudinal position of the counterweight is calculated using the counterweight point cloud data extracted from the second point cloud data.

3. The crankshaft shape inspection method according to claim 2, wherein moving the first point cloud data and the second point cloud data comprises, machining reference portion point cloud data, which are point cloud data of a predetermined machining reference portion, are extracted from the first point cloud data and the second point cloud data, and the first point cloud data and the second point cloud data are translated and rotated to make coordinates of a machining reference determined by the extracted machining reference portion point cloud data match with coordinates predetermined in a coordinate system used when the crankshaft is machined.

4. The crankshaft shape inspection method according to claim 3, wherein moving the first point cloud data and the second point cloud data comprises, the machining reference portion is two shaft portions, a single pin, and two adjacent counterweights of the crankshaft, and the machining reference is a center of each of the two shaft portions, a center of the single pin, and facing side surfaces of the two counterweights.

5. The crankshaft shape inspection method according to claim 4, wherein moving the first point cloud data and the second point cloud data comprises, regarding the two shaft portions and the single pin among the machining reference portions, as machining reference portion point cloud data, point cloud data of a portion that a fixing chuck for fixing the crankshaft comes into contact with are extracted.

6. The crankshaft shape inspection method according to claim 1, wherein the three-dimensional shape measuring device is a plurality of optical three-dimensional shape measuring devices that are arranged around a rotation center axis of the crankshaft, and measure a three-dimensional shape of the crankshaft by projecting and receiving light on and from the crankshaft while relatively moving in a direction parallel to the rotation center axis of the crankshaft.

7. The crankshaft shape inspection method according to claim 1, wherein the three-dimensional shape measuring device is four or more optical three-dimensional shape measuring devices that are arranged around a rotation center axis of the crankshaft, and measure a three-dimensional shape of the crankshaft by projecting and receiving light on and from the crankshaft while relatively moving in a direction parallel to the rotation center axis of the crankshaft, the three-dimensional shape measuring devices are divided into first-group shape measuring devices and second-group shape measuring devices, the first-group shape measuring devices that have light projection directions thereof inclined by an angle β in the same direction with respect to a direction orthogonal to the rotation center axis of the crankshaft and the second-group shape measuring devices that have light projection directions thereof inclined by the angle β in a direction different from the direction of the first-group shape measuring devices, the second-group shape measuring devices are arranged around the rotation center axis of the crankshaft between the first-group shape measuring devices, acquiring three-dimensional point cloud data of the surface of the crankshaft comprises, measurement results obtained by the four or more three-dimensional shape measuring devices are combined, to thereby generate three-dimensional point cloud data of the surface of the crankshaft, and calculating the side dimension and the longitudinal position of the counterweight comprise, when a measurement pitch of the three-dimensional point cloud data in a longitudinal direction is set to Δx, the first threshold value is set to Th1, and the second threshold value is set to Th2, a side dimension of the counterweight is calculated using the counterweight point cloud data extracted from the first point cloud data generated using the first threshold value Th1 satisfying Expression (1) below, and a longitudinal position of the counterweight is calculated using the counterweight point cloud data extracted from the second point cloud data generated using the second threshold value Th2 satisfying Expression (2) below, $$\Delta x < Th1 < 4\Delta x \quad (1)$$

$$\Delta x/\tan(\mathrm{abs}(\beta)) < Th2 \quad (2)$$

In Expression (2) above, abs(β) means the absolute value of β.

8. A crankshaft shape inspection method, comprising:

acquiring, by a computer processor including processing circuitry, three-dimensional point cloud data of a surface of a crankshaft by a three-dimensional shape measuring device measuring a surface shape of the crankshaft;

generating, by the computer processor, while using the three-dimensional point cloud data, first point cloud data based on point cloud data generated by performing isolated point removal processing that removes data points whose distance to the nearest neighbor data point is equal to or more than a first threshold value and second point cloud data based on point cloud data generated by performing isolated point removal processing that removes data points whose distance to the nearest neighbor data point is equal to or more than a second threshold value that is larger than the first threshold value; and extracting, by the computer processor, based on the first point cloud data and the second point cloud data, counterweight point cloud data, which are point cloud data of a counterweight of the crankshaft, calculating a side dimension of the counterweight using the counterweight point cloud data extracted from the first point cloud data, and calculating a longitudinal position of the counterweight using the counterweight point cloud data extracted from the second point cloud data, wherein generating, by the computer processor, the first point cloud data and the second point cloud data comprises translating and rotating, by the computer processor, the three-dimensional point cloud data to make a distance between the three-dimensional point cloud data and a surface shape model of the crankshaft prepared in advance based on design specifications of the crankshaft minimum, and superposing the three-dimensional point cloud data on the surface shape model, and performing, by the computer processor, isolated point removal processing that removes data points whose distance to the nearest neighbor data point is equal to or more than the first threshold value on the three-dimensional point cloud data superposed on the surface shape model to generate the first point cloud data, and at the same time, performing isolated point removal processing that removes data points whose distance to the nearest neighbor data point is equal to or more than the second threshold value on the three-dimensional point cloud data superposed on the surface shape model to generate the second point cloud data.

9. An arithmetic unit for inspecting a shape of a crankshaft, the arithmetic unit comprising:

a computer processor including processing circuitry programmed to perform operations comprising:

acquire three-dimensional point cloud data of a surface of the crankshaft based on a result obtained by a three-dimensional shape measuring device measuring a surface shape of the crankshaft;

generate, while using the three-dimensional point cloud data, first point cloud data based on point cloud data generated by performing isolated point removal processing that removes data points whose distance to the nearest neighbor data point is equal to or more than a first threshold value and second point cloud data based on point cloud data generated by performing isolated point removal processing that removes data points whose distance to the nearest neighbor data point is equal to or more than a second threshold value that is larger than the first threshold value; and extract, based on the first point cloud data and the second point cloud data, counterweight point cloud data, which are point cloud data of a counterweight of the crankshaft, calculate a side dimension of the counterweight using the counterweight point cloud data extracted from the first point cloud data, and calculate a longitudinal position of the counterweight using the counterweight point cloud data extracted from the second point cloud data, wherein generating the first point cloud data and the second point cloud data comprises generate first point cloud basic data by performing isolated point removal processing that removes data points whose distance to the nearest neighbor data point is equal to or more than the first threshold value on the three-dimensional point cloud data, and at the same time, generate second point cloud basic data by performing isolated point removal processing that removes data points whose distance to the nearest neighbor data point is equal to or more than the second threshold value on the three-dimensional point cloud data, and translate and rotate the first point cloud basic data and the second point cloud basic data to make distances between the first point cloud basic data and the second point cloud basic data and a surface shape model of the crankshaft prepared in advance based on design specifications of the crankshaft minimum and set the first point cloud basic data and the second point cloud basic data superposed on the surface shape model to the first point cloud data and the second point cloud data.

10. A crankshaft shape inspection apparatus, comprising:

a plurality of optical three-dimensional shape measuring devices that are arranged around a rotation center axis of a crankshaft, and measure a three-dimensional shape of the crankshaft by projecting and receiving light on and from the crankshaft while relatively moving in a direction parallel to the rotation center axis of the crankshaft; and an arithmetic unit that receives measurement results obtained by a plurality of the three-dimensional shape measuring devices and executes a predetermined arithmetic operation, wherein at least some of the three-dimensional shape measuring devices are arranged to be inclined to make light projection directions different from each other with respect to a direction orthogonal to the rotation center axis of the crankshaft, and the arithmetic unit includes:

a computer processor including processing circuitry programmed to perform operations comprising:

acquire three-dimensional point cloud data of a surface of the crankshaft based on results obtained by the three-dimensional shape measuring devices measuring a surface shape of the crankshaft;

generate, while using the three-dimensional point cloud data, first point cloud data based on point cloud data generated by performing isolated point removal processing that removes data points whose distance to the nearest neighbor data point is equal to or more than a first threshold value and second point cloud data based on point cloud data generated by performing isolated point removal processing that removes data points whose distance to the nearest neighbor data point is equal to or more than a second threshold value that is larger than the first threshold value; and extract, based on the first point cloud data and the second point cloud data, counterweight point cloud data, which are point cloud data of a counterweight of the crankshaft, calculate a side dimension of the counterweight using the counterweight point cloud data extracted from the first point cloud data, and calculate a longitudinal position of the counterweight using the counterweight point cloud data extracted from the second point cloud data, wherein generating, by the computer processor, the first point cloud data and the second point cloud data comprises generate, by the computer processor, first point cloud basic data by performing isolated point removal processing that removes data points whose distance to the nearest neighbor data point is equal to or more than the first threshold value on the three-dimensional point cloud data, and at the same time, generate second point cloud basic data by performing isolated point removal processing that removes data points whose distance to the nearest neighbor data point is equal to or more than the second threshold value on the three-dimensional point cloud data, and translate and rotate, by the computer processor, the first point cloud basic data and the second point cloud basic data to make distances between the first point cloud basic data and the second point cloud basic data and a surface shape model of the crankshaft prepared in advance based on design specifications of the crankshaft minimum and set the first point cloud basic data and the second point cloud basic data superposed on the surface shape model to the first point cloud data and the second point cloud data.

11. The crankshaft shape inspection apparatus according to claim 10, further comprising:

four or more of the optical three-dimensional shape measuring devices, wherein the three-dimensional shape measuring devices are divided into first-group shape measuring devices and second-group shape measuring devices, the first-group shape measuring devices that have light projection directions thereof inclined by an angle β in the same direction with respect to a direction orthogonal to the rotation center axis of the crankshaft and the second-group shape measuring devices that have light projection directions thereof inclined by the angle β in a direction different from the direction of the first-group shape measuring devices, and the second-group shape measuring devices are arranged around the rotation center axis of the crankshaft between the first-group shape measuring devices.

12. The crankshaft shape inspection apparatus according to claim 10, wherein the three-dimensional shape measuring devices have light projection directions thereof inclined by the angle β with respect to a direction orthogonal to the rotation center axis of the crankshaft, and when a measurement pitch of the three-dimensional point cloud data in a longitudinal direction is set to Δx, the first threshold value is set to Th1, and the second threshold value is set to Th2, the computer processor is programmed to perform operations comprising that:

calculate a side dimension of the counterweight using the counterweight point cloud data extracted from the first point cloud data generated using the first threshold value Th1 satisfying Expression (1) below, and calculate a longitudinal position of the counterweight using the counterweight point cloud data extracted from the second point cloud data generated using the second threshold value Th2 satisfying Expression (2) below, $$\Delta x < Th1 < 4\Delta x \quad (1)$$

$$\Delta x/\tan(\mathrm{abs}(B)) < Th2 \quad (2)$$

in Expression (2) above, abs(β) means the absolute value of β.

13. An arithmetic unit for inspecting a shape of a crankshaft, the arithmetic unit comprising:

a computer processor including processing circuitry programmed to perform operations comprising:

acquire three-dimensional point cloud data of a surface of the crankshaft based on a result obtained by a three-dimensional shape measuring device measuring a surface shape of the crankshaft;

generate, while using the three-dimensional point cloud data, first point cloud data based on point cloud data generated by performing isolated point removal processing that removes data points whose distance to the nearest neighbor data point is equal to or more than a first threshold value and second point cloud data based on point cloud data generated by performing isolated point removal processing that removes data points whose distance to the nearest neighbor data point is equal to or more than a second threshold value that is larger than the first threshold value; and extract, based on the first point cloud data and the second point cloud data, counterweight point cloud data, which are point cloud data of a counterweight of the crankshaft, calculate a side dimension of the counterweight using the counterweight point cloud data extracted from the first point cloud data, and calculate a longitudinal position of the counterweight using the counterweight point cloud data extracted from the second point cloud data, wherein generating the first point cloud data and the second point cloud data comprises translate and rotate the three-dimensional point cloud data to make a distance between the three-dimensional point cloud data and a surface shape model of the crankshaft prepared in advance based on design specifications of the crankshaft minimum, and superpose the three-dimensional point cloud data on the surface shape model, and perform isolated point removal processing that removes data points whose distance to the nearest neighbor data point is equal to or more than the first threshold value on the three-dimensional point cloud data superposed on the surface shape model to generate the first point cloud data, and at the same time, perform isolated point removal processing that removes data points whose distance to the nearest neighbor data point is equal to or more than the second threshold value on the three-dimensional point cloud data superposed on the surface shape model to generate the second point cloud data.

14. A crankshaft shape inspection apparatus, comprising:

a plurality of optical three-dimensional shape measuring devices that are arranged around a rotation center axis of a crankshaft, and measure a three-dimensional shape of the crankshaft by projecting and receiving light on and from the crankshaft while relatively moving in a direction parallel to the rotation center axis of the crankshaft; and an arithmetic unit that receives measurement results obtained by a plurality of the three-dimensional shape measuring devices and executes a predetermined arithmetic operation, wherein at least some of the three-dimensional shape measuring devices are arranged to be inclined to make light projection directions different from each other with respect to a direction orthogonal to the rotation center axis of the crankshaft, and the arithmetic unit includes:

a computer processor including processing circuitry programmed to perform operations comprising:

acquire three-dimensional point cloud data of a surface of the crankshaft based on results obtained by the three-dimensional shape measuring devices measuring a surface shape of the crankshaft;

generate, while using the three-dimensional point cloud data, first point cloud data based on point cloud data generated by performing isolated point removal processing that removes data points whose distance to the nearest neighbor data point is equal to or more than a first threshold value and second point cloud data based on point cloud data generated by performing isolated point removal processing that removes data points whose distance to the nearest neighbor data point is equal to or more than a second threshold value that is larger than the first threshold value; and extract, based on the first point cloud data and the second point cloud data, counterweight point cloud data, which are point cloud data of a counterweight of the crankshaft, calculate a side dimension of the counterweight using the counterweight point cloud data extracted from the first point cloud data, and calculate a longitudinal position of the counterweight using the counterweight point cloud data extracted from the second point cloud data, wherein generating the first point cloud data and the second point cloud data comprises translate and rotate the three-dimensional point cloud data to make a distance between the three-dimensional point cloud data and a surface shape model of the crankshaft prepared in advance based on design specifications of the crankshaft minimum, and superpose the three-dimensional point cloud data on the surface shape model, and perform isolated point removal processing that removes data points whose distance to the nearest neighbor data point is equal to or more than the first threshold value on the three-dimensional point cloud data superposed on the surface shape model to generate the first point cloud data, and at the same time, perform isolated point removal processing that removes data points whose distance to the nearest neighbor data point is equal to or more than the second threshold value on the three-dimensional point cloud data superposed on the surface shape model to generate the second point cloud data.

* * * * *